(12) United States Patent
Quigley et al.

(10) Patent No.: US 12,285,787 B2
(45) Date of Patent: *Apr. 29, 2025

(54) GREENHOUSE GAS EMISSIONS CONTROL

(71) Applicant: Loci Controls, Inc., Wareham, MA (US)

(72) Inventors: Peter Quigley, Duxbury, MA (US); Ian Martin, Higganum, CT (US); Nicole Neff, North Potomac, MD (US); Jack Rowbottom, Swansea, MA (US)

(73) Assignee: Loci Controls, Inc., Wareham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,492

(22) Filed: Nov. 22, 2023

(65) Prior Publication Data

US 2024/0091831 A1 Mar. 21, 2024

Related U.S. Application Data

(63) Continuation of application No. 17/540,833, filed on Dec. 2, 2021, now Pat. No. 11,865,594.

(60) Provisional application No. 63/244,542, filed on Sep. 15, 2021, provisional application No. 63/239,814, filed on Sep. 1, 2021, provisional application No. 63/120,933, filed on Dec. 3, 2020.

(51) Int. Cl.
*B09B 1/00* (2006.01)
(52) U.S. Cl.
CPC .............. *B09B 1/006* (2013.01); *Y02W 30/30* (2015.05)

(58) Field of Classification Search
CPC .............................. B09B 1/006; Y02W 30/30
See application file for complete search history.

(56) References Cited

U.S. PATENT DOCUMENTS

| 3,062,037 | A | 11/1962 | Donner et al. |
| 3,567,387 | A | 3/1971 | Jones |

(Continued)

FOREIGN PATENT DOCUMENTS

| CA | 2955844 C | 8/2019 |
| EP | 0 743 515 A1 | 11/1996 |

(Continued)

OTHER PUBLICATIONS

International Search Report and Written Opinion for International Application No. PCT/US2021/061609 mailed Mar. 24, 2022.

(Continued)

*Primary Examiner* — Janine M Kreck
(74) *Attorney, Agent, or Firm* — Wolf, Greenfield & Sacks, P.C.

(57) ABSTRACT

Systems and methods for controlling extraction of landfill gas from a landfill via a gas extraction system comprising a plurality of wells are provided herein. In some embodiments, the method comprises obtaining a concentration of a greenhouse gas measured a distance above a surface of a region comprising the plurality of wells; determining whether the measure of the concentration of the greenhouse gas is greater than a first threshold; and in response to determining that the measure of the concentration of the greenhouse gas is greater than the first threshold, increasing a flow rate of landfill gas being extracted from at least one well of the plurality of wells.

20 Claims, 17 Drawing Sheets

(56) References Cited

U.S. PATENT DOCUMENTS

| | | | |
|---|---|---|---|
| 4,026,355 A | 5/1977 | Johnson et al. |
| 4,191,541 A | 3/1980 | Jenkins |
| 4,227,897 A | 10/1980 | Reed |
| 4,494,380 A | 1/1985 | Cross |
| 4,499,378 A | 2/1985 | Miyatake et al. |
| 4,670,148 A | 6/1987 | Schneider |
| 4,890,672 A | 1/1990 | Hall |
| 5,063,519 A | 11/1991 | Zison |
| 5,209,941 A | 5/1993 | Wuest |
| 5,223,229 A | 6/1993 | Brucker |
| 5,451,249 A | 9/1995 | Spiegel et al. |
| 5,458,006 A | 10/1995 | Roqueta |
| 5,665,314 A | 9/1997 | Berger et al. |
| 5,681,360 A | 10/1997 | Siwajek et al. |
| 5,695,641 A | 12/1997 | Cosulich et al. |
| 5,830,262 A | 11/1998 | Marchini et al. |
| 6,169,962 B1 | 1/2001 | Brookshire et al. |
| 6,196,324 B1 | 3/2001 | Giacomino et al. |
| 6,241,950 B1 | 6/2001 | Veelenturf et al. |
| 6,399,391 B1 | 6/2002 | Tomlin |
| 6,591,695 B1 | 7/2003 | Brookshire et al. |
| 6,595,287 B2 | 7/2003 | Fisher |
| 6,611,760 B2 | 8/2003 | Bentley et al. |
| 6,749,368 B2 | 6/2004 | Ankeny et al. |
| 6,799,477 B2 | 10/2004 | Brookshire et al. |
| 6,999,883 B1 | 2/2006 | Brady et al. |
| 7,187,299 B2 | 3/2007 | Kunerth et al. |
| 7,198,433 B2 | 4/2007 | Augenstein et al. |
| 7,243,730 B2 | 7/2007 | Casey |
| 7,273,098 B2 | 9/2007 | Evans et al. |
| 7,373,976 B2 | 5/2008 | Casey |
| 7,387,163 B2 | 6/2008 | Seegers et al. |
| 7,448,828 B2 | 11/2008 | Augenstein et al. |
| 7,748,450 B2 | 7/2010 | Mundell |
| 7,866,921 B2 | 1/2011 | Stamoulis |
| 7,950,464 B2 | 5/2011 | Atencio et al. |
| 7,972,082 B2 | 7/2011 | Augenstein et al. |
| 8,047,276 B2 | 11/2011 | Stamoulis |
| 8,168,121 B2 | 5/2012 | Elkins |
| 8,186,211 B2 | 5/2012 | Boult et al. |
| 8,840,708 B1 | 9/2014 | Morrow et al. |
| 8,924,029 B2 | 12/2014 | Nath et al. |
| 9,062,536 B2 | 6/2015 | Fischer et al. |
| 10,029,290 B2 | 7/2018 | Campanella et al. |
| 10,400,560 B2 | 9/2019 | Campanella et al. |
| 10,408,747 B2 | 9/2019 | Schlueter et al. |
| 10,449,578 B2 | 10/2019 | Campanella et al. |
| 10,556,259 B2 | 2/2020 | Campanella et al. |
| 10,576,514 B2 | 3/2020 | Campanella et al. |
| 10,576,515 B2 | 3/2020 | Campanella et al. |
| 10,639,687 B2 | 5/2020 | Campanella et al. |
| 10,705,063 B2 | 7/2020 | Campanella et al. |
| 10,882,086 B2 | 1/2021 | Quigley et al. |
| 10,946,420 B2 | 3/2021 | Quigley et al. |
| 11,007,555 B2 | 5/2021 | Campanella et al. |
| 11,067,549 B2 | 7/2021 | Campanella et al. |
| 11,072,006 B2 | 7/2021 | Campanella et al. |
| 11,084,074 B2 | 8/2021 | Campanella et al. |
| 11,865,594 B2 * | 1/2024 | Quigley .............. B09B 1/006 |
| 2001/0005812 A1 | 6/2001 | Brookshire et al. |
| 2002/0101718 A1 | 8/2002 | Negishi |
| 2003/0000281 A1 | 1/2003 | Ketler et al. |
| 2004/0055359 A1 | 3/2004 | Ketler et al. |
| 2004/0121201 A1 | 6/2004 | Roche et al. |
| 2006/0034664 A1 | 2/2006 | Augenstein et al. |
| 2006/0251540 A1 | 11/2006 | Benning et al. |
| 2007/0224085 A1 | 9/2007 | Tooley |
| 2007/0225923 A1 | 9/2007 | Tooley |
| 2007/0243023 A1 | 10/2007 | Augenstein et al. |
| 2008/0011248 A1 | 1/2008 | Cutlip et al. |
| 2008/0127726 A1 | 6/2008 | Elkins |
| 2009/0136298 A1 | 5/2009 | Augenstein et al. |
| 2010/0310733 A1 | 12/2010 | Hoffman |
| 2011/0061439 A1 | 3/2011 | Dong et al. |
| 2011/0061874 A1 | 3/2011 | Stamoulis |
| 2011/0081586 A1 | 4/2011 | McAlister |
| 2011/0132104 A1 | 6/2011 | Benson et al. |
| 2011/0198094 A1 | 8/2011 | Stamoulis |
| 2011/0231099 A1 | 9/2011 | Elkins |
| 2011/0272420 A1 | 11/2011 | Landess et al. |
| 2012/0191349 A1 | 7/2012 | Lenz et al. |
| 2012/0206715 A1 | 8/2012 | Laub |
| 2012/0287418 A1 | 11/2012 | Scherer et al. |
| 2013/0180703 A1 | 7/2013 | Colby |
| 2013/0193325 A1 | 8/2013 | Phillips et al. |
| 2013/0247647 A1 | 9/2013 | Mahoney et al. |
| 2013/0334418 A1 | 12/2013 | Cowie et al. |
| 2014/0182846 A1 | 7/2014 | Fischer et al. |
| 2014/0284935 A1 | 9/2014 | Disbennett et al. |
| 2014/0338878 A1 | 11/2014 | Tessnow |
| 2015/0000426 A1 | 1/2015 | Mustang |
| 2015/0226045 A1 | 8/2015 | Fischer et al. |
| 2015/0275632 A1 | 10/2015 | Fischer et al. |
| 2015/0330938 A1 | 11/2015 | Henson et al. |
| 2015/0354032 A1 | 12/2015 | Yuan et al. |
| 2015/0362468 A1 | 12/2015 | Gerhold |
| 2016/0011159 A1 | 1/2016 | Sekiya et al. |
| 2016/0025696 A1 | 1/2016 | Birks et al. |
| 2016/0033391 A1 | 2/2016 | Stroganov et al. |
| 2016/0123946 A1 | 5/2016 | Dufresne |
| 2016/0169826 A1 | 6/2016 | Youssi et al. |
| 2016/0209133 A1 | 7/2016 | Hu et al. |
| 2016/0237007 A1 | 8/2016 | Morrow et al. |
| 2016/0238494 A1 | 8/2016 | Chrin, II |
| 2016/0247183 A1 | 8/2016 | Foody |
| 2016/0287870 A1 | 10/2016 | Yip et al. |
| 2016/0377457 A1 | 12/2016 | Zhang et al. |
| 2017/0080762 A1 | 3/2017 | Guinart et al. |
| 2017/0122065 A1 | 5/2017 | Fischer et al. |
| 2017/0176590 A1 | 6/2017 | Sharonov et al. |
| 2017/0216891 A1 * | 8/2017 | Campanella ....... G01N 33/0004 |
| 2017/0216892 A1 | 8/2017 | Campanella et al. |
| 2017/0216893 A1 | 8/2017 | Campanella et al. |
| 2017/0218730 A1 | 8/2017 | Campanella et al. |
| 2017/0218731 A1 | 8/2017 | Campanella et al. |
| 2017/0218732 A1 | 8/2017 | Campanella et al. |
| 2017/0254196 A1 | 9/2017 | Campanella et al. |
| 2017/0254787 A1 | 9/2017 | Campanella et al. |
| 2018/0003572 A1 | 1/2018 | Garsd et al. |
| 2018/0003684 A1 | 1/2018 | Kerr |
| 2018/0024202 A1 | 1/2018 | Erickson et al. |
| 2018/0154408 A1 | 6/2018 | Ko et al. |
| 2018/0164137 A1 | 6/2018 | Layher et al. |
| 2018/0171604 A1 | 6/2018 | Kim et al. |
| 2018/0209248 A1 | 7/2018 | Patel et al. |
| 2018/0304323 A1 | 10/2018 | Campanella et al. |
| 2019/0069245 A1 | 2/2019 | Miller et al. |
| 2019/0232346 A1 | 8/2019 | Speer et al. |
| 2019/0277119 A1 | 9/2019 | Campion |
| 2019/0277821 A1 | 9/2019 | Quigley et al. |
| 2020/0086365 A1 | 3/2020 | Campanella et al. |
| 2020/0101504 A1 | 4/2020 | Quigley et al. |
| 2020/0101505 A1 | 4/2020 | Quigley et al. |
| 2020/0130033 A1 | 4/2020 | Campanella et al. |
| 2020/0197990 A1 | 6/2020 | Quigley et al. |
| 2020/0254497 A1 | 8/2020 | Campanella et al. |
| 2020/0306806 A1 | 10/2020 | Quigley et al. |
| 2020/0306807 A1 | 10/2020 | Quigley et al. |
| 2021/0046524 A1 | 2/2021 | Quigley et al. |
| 2021/0062625 A1 | 3/2021 | Hale et al. |
| 2021/0178436 A1 | 6/2021 | Quigley et al. |
| 2021/0229142 A1 | 7/2021 | Quigley et al. |
| 2021/0372977 A1 | 12/2021 | Campanella et al. |
| 2022/0008973 A1 | 1/2022 | Quigley et al. |
| 2022/0062959 A1 | 3/2022 | Campanella et al. |
| 2022/0176422 A1 | 6/2022 | Quigley et al. |
| 2024/0201662 A1 | 6/2024 | Quigley et al. |

FOREIGN PATENT DOCUMENTS

| | | | |
|---|---|---|---|
| WO | WO 2006/005014 A2 | 1/2006 |
| WO | WO 2015/072989 A1 | 5/2015 |
| WO | WO 2016/010985 A1 | 1/2016 |

(56) References Cited

FOREIGN PATENT DOCUMENTS

| WO | WO 2018/194650 A1 | 10/2018 |
| WO | WO 2020/072457 A1 | 4/2020 |
| WO | WO 2022/056152 A1 | 3/2022 |

OTHER PUBLICATIONS

International Preliminary Report on Patentability for International Application No. PCT/US2021/061609 mailed Jun. 15, 2023.
International Search Report and Written Opinion for International Application No. PCT/US2017/020196 mailed Jun. 7, 2017.
Invitation to Pay Additional Fees for International Application No. PCT/US17/28818 mailed Jul. 10, 2017.
International Search Report and Written Opinion for International Application No. PCT/US17/28818 mailed Sep. 8, 2017.
International Search Report and Written Opinion for International Application No. PCT/US2019/020251 mailed May 31, 2019.
Extended European Search Report for European Application No. 17760717.3 dated Oct. 2, 2019.
International Search Report and Written Opinion for International Application No. PCT/US2019/054013 mailed Dec. 4, 2019.
Extended European Search Report for European Application No. 17906368.0 dated Oct. 15, 2020.
International Search Report and Written Opinion for International Application No. PCT/US2021/013850 mailed Jun. 21, 2021.
International Search Report and Written Opinion for International Application No. PCT/US2021/040653 mailed Nov. 26, 2021.
[No Author Listed], 50% CH4, 35% CO2, 15% N2. Instrument Depot. 2015. http://www.instrumentdepot.com/50-methane-35-carbon-dioxide-15-nitrogen-c-1_27_472.html [last accessed Sep. 25, 2015].
[No Author Listed], Cloud-Based Wellwatcher Analytics Platform Offers 24/7/365. Visibility on Landfill Gas-Collection Systems. Tech Note. Loci Controls. Nov. 2016. 1 page.
[No Author Listed], Increase Landfill Gas Collection By Up To 30%. Tech Note. Loci Controls. Oct. 2016. 1 page.
[No Author Listed], Loci Controller Combines Active Flow Control With 24/7/365 Real-Time Gas-Composition Analysis to Maximize Landfill Gas Extraction. Tech Note. Loci Controls. Nov. 2016. 1 page.
[No Author Listed], Loci Sentry Utilizes Passive Flow and Gas-Composition Monitoring in Conjunction With Loci Controller and Wellwatcher Analytics to Maximize Landfill Gas Collection. Tech Note. Loci Controls. Nov. 2016. 1 page.
[No Author Listed], Methacontrol® Optimizing landfill gas recovery. Oct. 9, 2013. http://www.veolia.com/en/veolia-group/media/news/methacontrol-r. 1 page.
Bieker et al., Real-Time Production Optimization of Offshore Oil and Gas Production Systems: A Technology Survey. SPE International. 2006. 8 pages.
Collins et al., Web-based monitoring of year-length deployments of autonomous gas sensing platforms on landfill sites. 2011 IEEE Sensors Proceedings. 2011:1620-3.
Fay et al., Remote Real-Time Monitoring of Subsurface Landfill Gas Migration. Sensors. 2011;11(7):6603-29.
Xu et al., Impact of changes in barometric pressure on landfill methane emission. AGU Publications. Jul. 10, 2014. 17 pages.
Quigley et al., Landfill Gas Emissions Monitoring and Control. Co-pending U.S. Appl. No. 18/540,407, filed Dec. 14, 2023.
International Search Report and Written Opinion for International Application No. PCT/US2023/084078 mailed Jun. 17, 2024.
Invitation to Pay Additional Fees for International Application No. PCT/US2023/084078 mailed Apr. 26, 2024.

\* cited by examiner

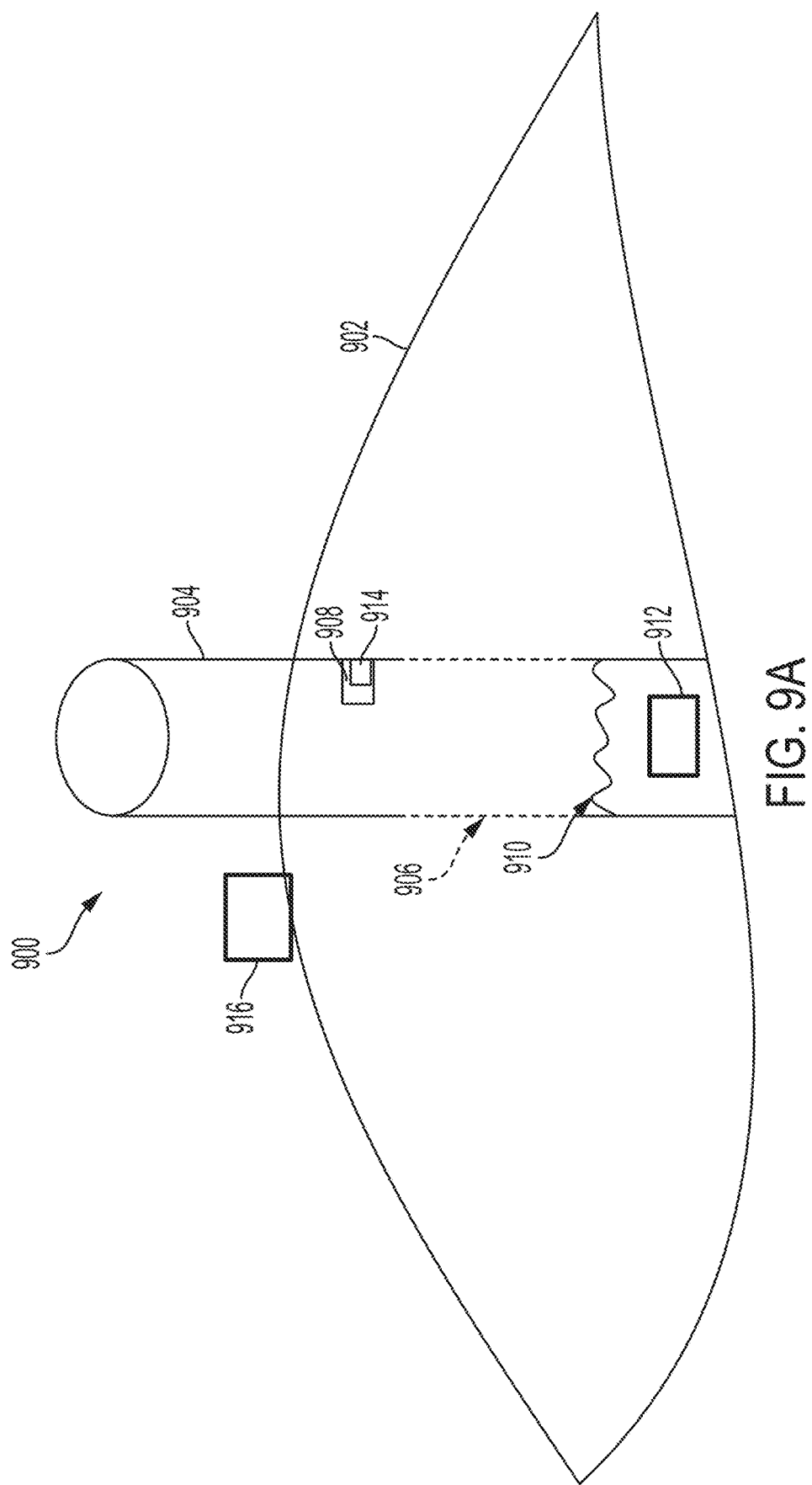

GREENHOUSE GAS EMISSIONS CONTROL

CROSS REFERENCE TO RELATED APPLICATIONS

This application is a continuation of and claims priority under 35 U.S.C. § 120 to U.S. patent application Ser. No. 17/540,833 titled "GREENHOUSE GAS EMISSIONS CONTROL" and filed on Dec. 2, 2021, which claims the benefit of priority under § 119 (e) to U.S. Provisional Application Ser. No. 63/120,933 titled "GREENHOUSE GAS EMISSIONS CONTROL" and filed on Dec. 3, 2020, U.S. Provisional Application Ser. No. 63/239,814 titled "GREENHOUSE GAS EMISSIONS CONTROL" and filed on Sep. 1, 2021, and U.S. Provisional Application Ser. No. 63/244,542 titled "GREENHOUSE GAS EMISSIONS CONTROL" and filed on Sep. 15, 2021, each of which is incorporated by reference herein in its entirety.

FEDERALLY SPONSORED RESEARCH

This invention was made with government support under SBIR Phase II Award No. 1632439 and SBIR Phase 1B Award No. 1520346, awarded by the National Science Foundation. The government has certain rights in the invention.

BACKGROUND

Landfills typically produce landfill gas as a result of decomposition processes occurring in the waste, and methane is often a component of this landfill gas. In order to reduce emissions of methane and other contaminants in landfill gas, the landfill sites are typically capped with a layer of cover material and gas extraction systems are installed to pull landfill gas out before it can penetrate the cover layer and escape. At larger sites, these gas extraction systems can consist of a plurality of vertical and horizontal wells drilled into the landfill, which are connected with piping to one or more vacuum sources. The cover layer prevents gas from freely escaping, while the vacuum in the extraction wells pulls landfill gas into the collection system. A conventional landfill gas extraction well typically has a manual valve that adjusts the localized vacuum pressure in that well, as well as a set of ports for sampling the gas characteristics with a portable gas analyzer. Landfill gas is most often disposed of in a flare, processed for direct use, or used to power electricity generation equipment (such as generators or gas turbines).

SUMMARY

According to some embodiments there is provided a method performed by at least one controller for controlling extraction of landfill gas from a landfill via a gas extraction system comprising a plurality of wells, the method comprising: obtaining a concentration of a greenhouse gas measured a distance above a surface of a region comprising the plurality of wells; determining whether the measure of the concentration of the greenhouse gas is greater than a first threshold; and in response to determining that the measure of the concentration of the greenhouse gas is greater than the first threshold, increasing a flow rate of landfill gas being extracted from at least one well of the plurality of wells.

Some embodiments provide for a control system for controlling extraction of landfill gas from a landfill via a gas extraction system comprising a plurality of wells, the control system comprising: at least one controller configured to: obtain a concentration of a greenhouse gas measured a fixed distance above a surface of a region comprising the plurality of wells; determine whether the concentration of the greenhouse gas is greater than a first threshold; and in response to determining that the concentration of the greenhouse gas is greater than the first threshold, increase a flow rate of landfill gas being extracted from at least one well of the plurality of wells.

Some embodiments provide for at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining a concentration of a greenhouse gas measured a distance above a surface of a region comprising the plurality of wells; determining whether the concentration of the greenhouse gas is greater than a first threshold; and in response to determining that the concentration of the greenhouse gas is greater than the first threshold, increasing a flow rate of landfill gas being extracted from at least one well of the plurality of wells.

BRIEF DESCRIPTION OF THE DRAWINGS

Various aspects and embodiments will be described with reference to the following figures. It should be appreciated that the figures are not necessarily drawn to scale. For purposes of clarity, not every component may be labeled in every drawing. In the drawings:

FIG. 9A illustrates an example system for monitoring a liquid level of a gas extraction well, according to some embodiments.

DETAILED DESCRIPTION

I. Introduction

Figure 1:
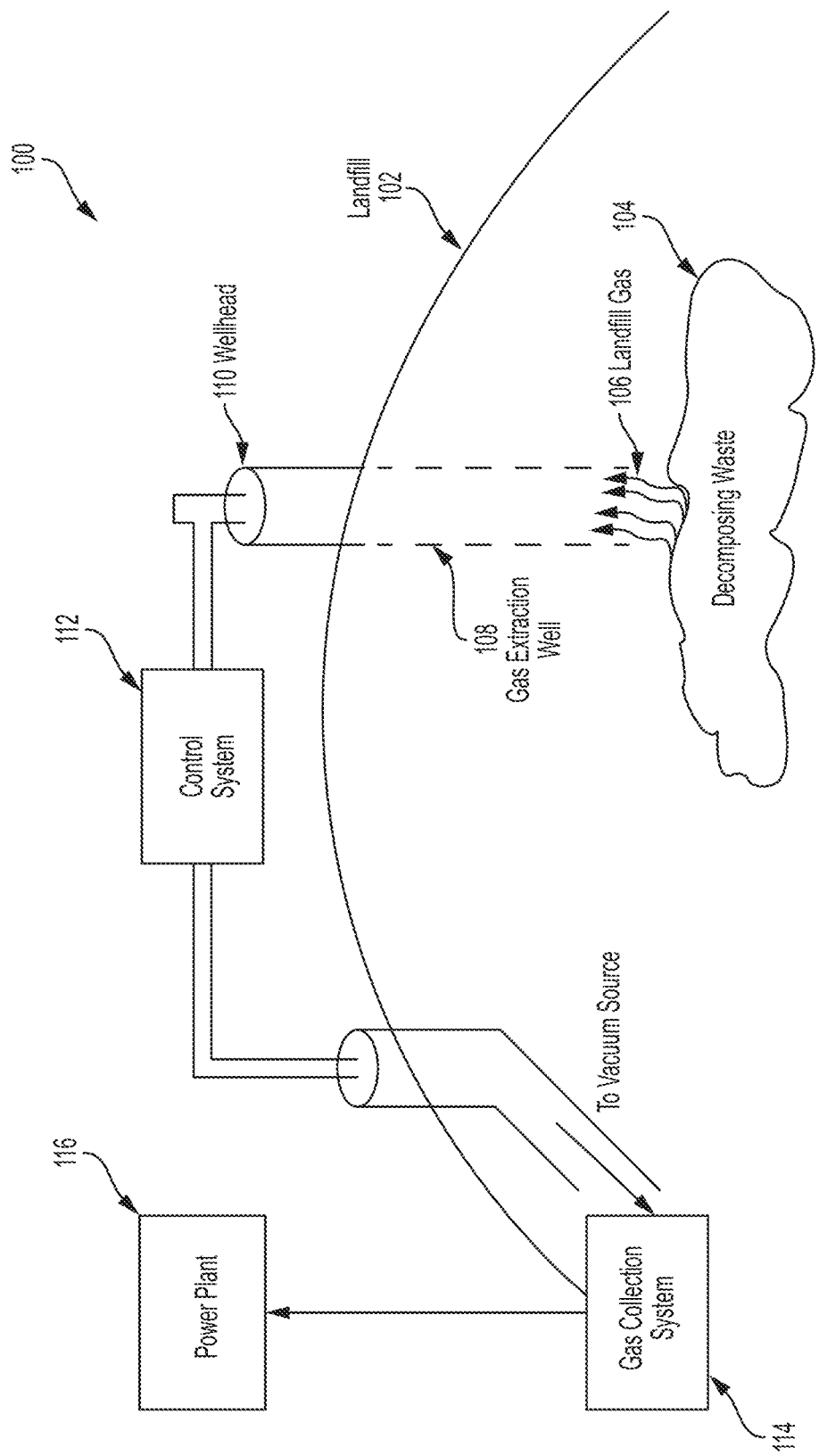
FIG. 1 is a sketch illustrating a landfill gas extraction system, according to some embodiments.

Decomposition processes of landfill waste typically produce landfill gas as a by-product. The landfill gas produced comprises a mixture of harmful gasses, including greenhouse gasses such as methane and carbon dioxide, for example. If left unchecked, such harmful gasses may rise, penetrating a cover layer at a surface of the landfill, and being emitted into the atmosphere, resulting in bad odors and pollution to the environment.

In order to mitigate greenhouse gas emissions from a landfill, landfill gas that has accumulated underneath a surface of the landfill may be extracted via a plurality of gas extraction wells before the landfill gas is able to penetrate the cover layer of the landfill and be emitted into the atmosphere. To effectively prevent greenhouse gases present in the landfill gas from being emitted into the atmosphere while also preventing underground fires and other hazardous conditions which result from extracting not only landfill gas from the landfill but also pulling oxygen from the atmosphere underneath the cover layer of the landfill, the flow rate at which landfill gas is extracted from the landfill may be precisely controlled.

Conventional techniques adjust flow rates of landfill gas extraction based on characteristics, such as gas composition, of the landfill gas being extracted from the landfill itself. For example, extracted landfill gas having a high methane concentration may indicate that the flow rate is too low to adequately prevent landfill gas from escaping the landfill and being emitted into the atmosphere. While such conventional techniques are effective in reducing greenhouse gas emissions to some extent, they only allow for indirect mitigation of greenhouse gas emissions and may therefore lack the precision necessary to effectively prevent greenhouse gas emissions entirely.

The inventors have recognized that greenhouse gas emissions from a landfill may be more effectively reduced via a gas extraction technique based directly on characteristics of the greenhouse gas emissions themselves. Accordingly, in some embodiments, characteristics of greenhouse gas emissions at a landfill are measured directly and such measurements are used to control extraction of landfill gas from the landfill. For example, in some embodiments, landfill gas extraction flow rates may be controlled based on a measure of mass flow rate of a greenhouse gas being emitted from the landfill and/or a measure of a concentration of a greenhouse gas measured a fixed distance above a surface of the landfill. In this way, the technology developed by the inventors and described herein provides for more precise reduction (e.g., with a smaller margin of error) of greenhouse gas emissions from a landfill, thereby preventing pollution and bad odors.

Accordingly, the inventors have developed a method, which may be performed by at least one controller, for controlling extraction of landfill gas from a landfill via a gas extraction system comprising a plurality of wells, the method comprising: (1) obtaining a measure of a mass flow rate of a greenhouse gas (e.g., methane, carbon dioxide) being emitted from the landfill above a surface of a region comprising the plurality of wells (for example, at least once per day, at least once per hour, etc.); (2) determining whether the measure of mass flow rate is greater than a first threshold (e.g., 0.00004 kg/min, 0.00005 kg/min, 0.00010 kg/min, 0.000004 kg/min, 0.000005 kg/min, 0.00001 kg/min, 0.0 kg/min per meter squared of landfill surface area for methane, 0.00004 kg/min, 0.00005 kg/min, 0.00010 kg/min, 0.000004 kg/min, 0.000005 kg/min, 0.00001 kg/min, 0.0 kg/min per meter squared of landfill surface area for carbon dioxide); and (3) in response to determining that the measure of mass flow rate is greater than the first threshold, increasing a flow rate of landfill gas being extracted from the at least one well of the plurality of wells (for example, by increasing a degree to which a valve of the at least one well is open and/or by increasing a vacuum applied to the plurality of wells).

In some embodiments, obtaining the measure of mass flow rate of the greenhouse gas comprises obtaining the measure of mass flow rate using at least one sensor, for example, at least one ground-based optical sensor, at least one aerial optical sensor, which may be mounted to an aerial vehicle (e.g., an autonomous drone).

In some embodiments, the method further comprises, before increasing the flow rate of the landfill gas being extracted from the at least one well: (1) obtaining a measure of a liquid level in the at least one well; and (2) determining whether the measure of the liquid level in the at least one well is less than a liquid level threshold (e.g., 10% or more, 25% or more, 50% or more of a perforated section of the at least one well). In some embodiments, the method further comprises (3) when it is determined that the measure of the liquid level in the at least one well is less than the liquid level threshold, increasing the flow rate of the landfill gas being extracted from the at least one well. In some embodiments, the method further comprises (4) transmitting an alert when it is determined that the measure of the liquid level in the at least one well is not less than the liquid level threshold.

In some embodiments, the method further comprises, obtaining, from a pressure sensor, a measure of pressure in tubing disposed in the at least one well, the tubing having an opening at a first end for receiving liquid in the at least one well. In some embodiments, determining the measure of the of the liquid level comprises determining the measure of the liquid level based on the obtained measure of pressure in the tubing. In some embodiments, the method further comprises, when it is determined the measure of the liquid level is not less than the liquid level threshold, transmitting an alert.

In some embodiments, increasing the flow rate of landfill gas being extracted from the at least one well comprises increasing a flow rate of landfill gas being extracted from a subset of the plurality of wells, wherein the subset of the plurality of wells comprises one or more of the plurality of wells extracted landfill gas having an oxygen concentration below a second threshold (e.g., 5% oxygen, 1% oxygen, 0% oxygen). In some embodiments, increasing the flow rate of landfill gas being extracted from the at least one well comprises: (1) identifying a subset of wells based on their respective measured concentrations of a constituent gas (e.g., oxygen, balance gas) (e.g., wells having a measured concentration of the constituent gas among the bottom 50%, the bottom 20%, etc., of measured concentrations of the constituent gas for wells in the plurality of wells); and (2) increasing a flow rate of landfill gas being extracted from the subset of the plurality of wells.

In some embodiments, the method further comprises, (1) before increasing the flow rate of the landfill gas being extracted from the at least one well, determining whether the degree to which the at least one well is open is less than a threshold degree (e.g., 80% open, 85% open, 90% open, 95% open, 100% open), and (2) increasing the flow rate of landfill gas being extracted from the at least one well in response to determining that the degree to which the valve of the at least one well is open is less than the threshold degree. In some embodiments, the method further comprises maintaining a position of the valve in response to determining that the measure of mass flow rate of the greenhouse gas is not greater than (e.g., less than, less than or equal to) the first threshold.

According to some aspects, there is provided a control system for controlling extraction of landfill gas from a landfill via a gas extraction system comprising a plurality of wells, the control system comprising: at least one controller configured to: (1) obtain, for example, at least once per day, at least once per hour, a measure of mass flow rate of a greenhouse gas (e.g., methane, carbon dioxide) being emitted from the landfill above a surface of a region comprising the plurality of wells; (2) determine whether the measure of mass flow rate is greater than a first threshold (e.g., 0.00004 kg/min, 0.00005 kg/min, 0.00010 kg/min, 0.000004 kg/min, 0.000005 kg/min, 0.00001 kg/min, 0.0 kg/min per meter squared of landfill surface area for methane, 0.00004 kg/min, 0.00005 kg/min, 0.00010 kg/min, 0.000004 kg/min, 0.000005 kg/min, 0.00001 kg/min, 0.0 kg/min per meter squared of landfill surface area for carbon dioxide); and (3) in response to determining that the measure of mass flow rate is greater than the firs threshold, increasing a flow rate of landfill gas being extracted from the at least one well of the plurality of wells (e.g., by increasing a degree to which a valve, for example, a remotely located valve remotely controlled by the at least one controller) of the at least one well is open and/or increasing a vacuum applied to the plurality of wells).

In some embodiments, the system further comprises at least one sensor configured to obtain the measure of mass flow rate of the greenhouse gas, for example, at least one ground-based optical sensor, at least one aerial optical sensor, which may be mounted to an aerial vehicle (e.g., an autonomous drone).

In some embodiments, the system further comprises a sensor (e.g., a pressure sensor) configured to obtain a measure of a liquid level in the at least one well, and the at least one controller is further configured to, before increasing the flow rate of the landfill gas being extracted from the at least one well, (1) obtain the measure of a liquid level in the at least one well; and (2) determine whether the measure of the liquid level in the at least one well is less than a liquid level threshold (e.g., 25% or more of the a perforated section of the at least one well). In some embodiments, the at least one controller is further configured to (3) when it is determined that the measure of the liquid level in the at least one well is less than the liquid level threshold, increase the flow rate of the landfill gas being extracted from the at least one well. In some embodiments, the at least one controller is further configured to (4) transmit an alert when it is determined that the measure of the liquid level in the at least one well is not less than the liquid level threshold.

In some embodiments, increasing the flow rate of landfill gas being extracted from the at least one well comprises increasing a flow rate of landfill gas being extracted from a subset of the plurality of wells, wherein the subset of the plurality of wells comprises one or more of the plurality of wells extracted landfill gas having an oxygen concentration below (e.g., less than, less than or equal to) a second threshold (e.g., 5% oxygen, 1% oxygen, 0% oxygen). In some embodiments, increasing the flow rate of landfill gas being extracted from the at least one well comprises: (1) identifying a subset of wells based on their respective measured concentrations of a constituent gas (e.g., oxygen, balance gas) (e.g., wells having a measured concentration of the constituent gas among the bottom 50%, the bottom 20%, etc., of measured concentrations of the constituent gas for wells in the plurality of wells); and (2) increasing a flow rate of landfill gas being extracted from the subset of the plurality of wells. In some embodiments, the system further comprises at least one sensor configured to measure a concentration of at least one constituent gas in the landfill gas being extracted from the at least one well.

In some embodiments, the at least one controller is further configured to, (1) before increasing the flow rate of the landfill gas being extracted from the at least one well, determine whether the degree to which the at least one well is open is less than a threshold degree (e.g., 80% open, 85% open, 90% open, 95% open, 100% open), and (2) increase the flow rate of landfill gas being extracted from the at least one well in response to determining that the degree to which the valve of the at least one well is open is less than the threshold degree. In some embodiments, the at least one controller is further configured to maintain a position of the valve in response to determining that the measure of mass flow rate of the greenhouse gas is not greater than (e.g., less than, less than or equal to) the first threshold.

Some embodiments provide for at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining a measure of mass flow rate of a greenhouse gas being emitted from the landfill above a surface of a region comprising the plurality of wells; determining whether the measure of mass flow rate is greater than a first threshold; and in response to determining that the measure of mass flow rate is greater than the first threshold, increasing a flow rate of landfill gas being extracted from at least one well of the plurality of wells.

According to some aspects, there is provided a method, which may be performed by at least one controller, for controlling extraction of landfill gas from a landfill via a gas extraction system comprising a plurality of wells, the method comprising: (1) obtaining, for example, at least once per day, at least once per hour, a concentration of a greenhouse gas (e.g., methane, carbon dioxide) measured a fixed distance above a surface of a region comprising the plurality of wells; (2) determining whether the measure of the concentration of the greenhouse gas is greater than a first threshold (e.g., 1000 ppm, 900 ppm, 500 ppm, 400 ppm, 300 ppm, 200 ppm, 100 ppm, 10 ppm, 0 ppm, between 0 and 500 ppm, between 0 and 1000 ppm, between 10 and 100 ppm methane measured 1 meter above the surface of the region comprising the plurality of wells, 1000 ppm, 900 ppm, 500 ppm, 400 ppm, 300 ppm, 200 ppm, 100 ppm, 10 ppm, 0 ppm, between 0 and 500 ppm, between 0 and 1000 ppm, between 10 and 100 ppm carbon dioxide measured 1 meter above the surface of the region comprising the plurality of wells); and (3) in response to determining that the measure of the concentration of the greenhouse gas is greater than the first threshold, increasing a flow rate of landfill gas being extracted from at least one well of the plurality of wells (for example, by increasing a degree to which a valve of the at least one well is open and/or increasing a vacuum applied to the plurality of wells).

In some embodiments, obtaining the concentration of the greenhouse gas comprises obtaining the concentration of the greenhouse gas using at least one sensor, for example, at least one ground-based optical sensor, at least one aerial optical sensor, which may be mounted to an aerial vehicle (e.g., an autonomous drone).

In some embodiments, the method further comprises, before increasing the flow rate of the landfill gas being extracted from the at least one well, (1) obtaining a measure of a liquid level in the at least one well; and (2) determining whether the measure of the liquid level in the at least one well is less than a liquid level threshold (e.g., 10% or more, 25% or more of a perforated section of the at least one well). In some embodiments, the method further comprises (3) when it is determined that the measure of the liquid level in the at least one well is less than the liquid level threshold, increasing the flow rate of the landfill gas being extracted from the at least one well. In some embodiments, the method further comprises (4) transmitting an alert when it is determined that the measure of the liquid level in the at least one well is not less than the liquid level threshold.

In some embodiments, increasing the flow rate of landfill gas being extracted from the at least one well comprises increasing a flow rate of landfill gas being extracted from a subset of the plurality of wells, wherein the subset of the plurality of wells comprises one or more of the plurality of wells extracted landfill gas having an oxygen concentration below a second threshold (e.g., 5% oxygen, 1% oxygen, 0% oxygen). In some embodiments, increasing the flow rate of landfill gas being extracted from the at least one well comprises: (1) identifying a subset of wells based on their respective measured concentrations of a constituent gas (e.g., oxygen, balance gas) (e.g., wells having a measured concentration of the constituent gas among the bottom 50%, the bottom 20%, etc., of measured concentrations of the constituent gas for wells in the plurality of wells); and (2) increasing a flow rate of landfill gas being extracted from the subset of the plurality of wells.

In some embodiments, the method further comprises, (1) before increasing the flow rate of the landfill gas being extracted from the at least one well, determining whether the degree to which the at least one well is open is less than a threshold degree (e.g., 80% open, 85% open, 90% open, 95% open, 100% open), and (2) increasing the flow rate of landfill gas being extracted from the at least one well in response to determining that the degree to which the valve of the at least one well is open is less than the threshold degree. In some embodiments, the method further comprises maintaining a position of the valve in response to determining that the measure of mass flow rate of the greenhouse gas is not greater than (e.g., less than, less than or equal to) the first threshold.

In some embodiments, determining whether liquid level in the at least one well exceeds a threshold may be determined using a measure of change in flow rate. For example, a decrease in flow rate may be indicative of an increased liquid level, as elevated liquid levels may be blocking landfill gas from entering a perforated section of the at least one well. As described herein, it may be undesirable to increase a flow rate of landfill gas extraction in a well when a liquid level is at an exceedance (e.g., resulting in a 50% reduction in landfill gas flow). Thus, in some embodiments, obtaining a measure of liquid level in the at least one well may comprise indirectly obtaining a measure of liquid level by determining a change in flow rate of landfill gas being extracted from the at least one well, and determining whether to increase flow rate of the at least one well based on the determined change in flow rate.

Some embodiments provide for a control system for controlling extraction of landfill gas from a landfill via a gas extraction system comprising a plurality of wells, the control system comprising: at least one controller configured to obtain, for example, at least once per day, at least once per hour, a concentration of a greenhouse gas (e.g., methane, carbon dioxide) measured a fixed distance above a surface of a region comprising the plurality of wells; determine whether the measure of the concentration of the greenhouse gas is greater than a first threshold (e.g., 1000 ppm, 900 ppm, 500 ppm, 400 ppm, 300 ppm, 200 ppm, 100 ppm, 10 ppm, 0 ppm, between 0 and 500 ppm, between 0 and 1000 ppm, between 10 and 100 ppm methane measured 1 meter above the surface of the region comprising the plurality of wells, 1000 ppm, 900 ppm, 500 ppm, 400 ppm, 300 ppm, 200 ppm, 100 ppm, 10 ppm, 0 ppm, between 0 and 500 ppm, between 0 and 1000 ppm, between 10 and 100 ppm carbon dioxide measured 1 meter above the surface of the region comprising the plurality of wells); and in response to determining that the measure of the concentration of the greenhouse gas is greater than the first threshold, increase a flow rate of landfill gas being extracted from at least one well of the plurality of wells (for example, by increasing a degree to which a valve of the at least one well is open and/or increasing a vacuum applied to the plurality of wells).

In some embodiments, the system further comprises at least one sensor configured to obtain the concentration of the greenhouse gas, for example, at least one ground-based optical sensor, at least one aerial optical sensor, which may be mounted to an aerial vehicle (e.g., an autonomous drone).

In some embodiments, the system further comprises a sensor (e.g., a pressure sensor) configured to obtain a measure of a liquid level in the at least one well, and the at least one controller is further configured to, before increasing the flow rate of the landfill gas being extracted from the at least one well, (1) obtain the measure of a liquid level in the at least one well; and (2) determine whether the measure of the liquid level in the at least one well is less than a liquid level threshold (e.g., 25% or more of the a perforated section of the at least one well). In some embodiments, the at least one controller is further configured to (3) when it is determined that the measure of the liquid level in the at least one well is less than the liquid level threshold, increase the flow rate of the landfill gas being extracted from the at least one well. In some embodiments, the at least one controller is further configured to (4) transmit an alert when it is determined that the measure of the liquid level in the at least one well is not less than the liquid level threshold. In some embodiments, the at least one controller is further configured to actuate a pump installed in the at least one well to reduce the liquid level below the liquid level threshold when it is determined that the measure of the liquid level in the at least one well is not less than the liquid level threshold.

In some embodiments, increasing the flow rate of landfill gas being extracted from the at least one well comprises increasing a flow rate of landfill gas being extracted from a subset of the plurality of wells, wherein the subset of the plurality of wells comprises one or more of the plurality of wells extracted landfill gas having an oxygen concentration below (e.g., less than, less than or equal to) a second threshold (e.g., 5% oxygen, 1% oxygen, 0% oxygen). In some embodiments, increasing the flow rate of landfill gas being extracted from the at least one well comprises: (1) identifying a subset of wells based on their respective measured concentrations of a constituent gas (e.g., oxygen, balance gas) (e.g., wells having a measured concentration of the constituent gas among the bottom 50%, the bottom 20%, etc., of measured concentrations of the constituent gas for wells in the plurality of wells); and (2) increasing a flow rate of landfill gas being extracted from the subset of the plurality of wells. In some embodiments, the system further comprises at least one sensor configured to measure a concentration of at least one constituent gas in the landfill gas being extracted from the at least one well.

In some embodiments, the at least one controller is further configured to, (1) before increasing the flow rate of the landfill gas being extracted from the at least one well, determine whether the degree to which the at least one well is open is less than a threshold degree (e.g., 80% open, 85% open, 90% open, 95% open, 100% open), and (2) increase the flow rate of landfill gas being extracted from the at least one well in response to determining that the degree to which the valve of the at least one well is open is less than the threshold degree. In some embodiments, the at least one controller is further configured to maintain a position of the valve in response to determining that the measure of mass flow rate of the greenhouse gas is not greater than (e.g., less than, less than or equal to) the first threshold.

In some embodiments, increasing the flow rate of the landfill gas being extracted from the at least one well of the plurality of wells comprises increasing, with the at least one controller, a vacuum applied to the plurality of wells. In some embodiments, increasing the flow rate of landfill gas being extracted from the at least one well of the plurality of wells further comprises increasing, with the at least one controller, a degree to which a valve of the at least one well is open.

Some embodiments provide for at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining a concentration of a greenhouse gas measured a distance above a surface of a region comprising the plurality of wells; determining whether the concentration of the greenhouse gas is greater than a first threshold; and in response to determining that the concentration of the greenhouse gas is greater than the first threshold, increasing a flow rate of landfill gas being extracted from at least one well of the plurality of wells.

According to some aspects, there is provided at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining a concentration of a greenhouse gas measured a distance above a surface of a region comprising the plurality of wells; determining whether the concentration of the greenhouse gas is greater than a first threshold; and in response to determining that the concentration of the greenhouse gas is greater than the first threshold, increasing a flow rate of landfill gas being extracted from at least one well of the plurality of wells.

Some embodiments provide for a method performed by at least one controller for controlling extraction of landfill gas from a landfill via a gas extraction system comprising a plurality of wells, the method comprising: obtaining concentrations of a greenhouse gas (e.g., methane, carbon dioxide) measured by a plurality of emissions sensors positioned at respective fixed distances above a surface of a region comprising the plurality of wells; obtaining measures of wind speed and/or direction measured by a plurality of wind sensors (e.g., a plurality of ultrasonic transducer anemometers) co-located with the plurality of emissions sensors at respective fixed distances above the surface of the region comprising the plurality of wells; determining, based on the obtained concentrations of the greenhouse gas and the measures of windspeed and/or direction, an aggregate measure of mass flow rate of the greenhouse gas for the region comprising the plurality of wells; determining whether the aggregate measure of mass flow rate is greater than a threshold (e.g., 0.0 kg/min of the greenhouse gas per meter squared of landfill surface area; 0.0005 kg/min of the greenhouse gas per meter squared of landfill surface area); and when it is determined that the aggregate measure of mass flow rate is greater than the threshold, increasing a flow rate of landfill gas being extracted from at least one well of the plurality of wells at least in part by transmitting a control adjustment, with the at least one controller, to a valve of the at least one well causing the valve to open to a greater degree.

In some embodiments, at least some of the respective ones of the plurality of emissions sensors are disposed substantially directly above respective ones of the plurality of wells.

In some embodiments, at least some of the plurality of emissions sensors are distanced from respective ones of the plurality of wells in a direction substantially perpendicular to a direction in which the fixed distance extends.

In some embodiments, the method further comprises obtaining a measure a barometric pressure, a humidity, and/or a temperature of ambient air in the region. The determining the aggregate measure of mass flow rate may be further based on the measure of the barometric pressure, the humidity, and/or the temperature of the ambient air in the region.

In some embodiments, the respective fixed distances above the surface of the region comprising the plurality of wells at which the plurality of emissions sensors is positioned are substantially the same. In some embodiments, the respective fixed distances above the surface of the region comprising the plurality of wells at which the plurality of emissions sensors is positioned are the same.

Some embodiments provide for a control system for controlling extraction of landfill gas from a landfill via a gas extraction system, the control system comprising: at least one controller configured to: obtain concentrations of a greenhouse gas (e.g., methane, carbon dioxide) measured by a plurality of emissions sensors positioned at respective fixed distances above a surface of a region comprising the plurality of wells; obtain measures of wind speed and/or direction measured by a plurality of wind sensors (e.g., a plurality of ultrasonic transducer anemometers) co-located with the plurality of emissions sensors at the respective fixed distances above the surface of the region comprising the plurality of wells; determine, based on the obtained concentrations of the greenhouse gas and the measures of windspeed and/or direction, an aggregate measure of mass flow rate of the greenhouse gas for the region comprising the plurality of wells; determine whether the aggregate measure of mass flow rate is greater than a threshold (e.g., 0.0 kg/min of the greenhouse gas per meter squared of landfill surface area, 0.0005 kg/min of the greenhouse gas per meter squared of landfill surface area); and when it is determined that the aggregate measure of mass flow rate is greater than the threshold, increase a flow rate of landfill gas being extracted from at least one well of the plurality of wells at least in part by transmitting a control adjustment, with the at least one controller, to a valve of the at least one well causing the valve to open to a greater degree.

Some embodiments provide for at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining concentrations of a greenhouse gas measured by a plurality of emissions sensors positioned at respective fixed distances above a surface of a region comprising the plurality of wells; obtaining measures of wind speed and/or direction measured by a plurality of wind sensors co-located with the plurality of emissions sensors at the respective fixed distances above the surface of the region comprising the plurality of wells; determining, based on the obtained concentrations of the greenhouse gas and the measures of windspeed and/or direction, an aggregate measure of mass flow rate of the greenhouse gas for the region comprising the plurality of wells; determining whether the aggregate measure of mass flow rate is greater than a threshold; and when it is determined that the aggregate measure of mass flow rate is greater than the threshold, increasing a flow rate of landfill gas being extracted from at least one well of the plurality of wells at least in part by transmitting, with the at least one controller, a control adjustment to a valve of the at least one well causing the valve to open to a greater degree.

Some embodiments provide for a method performed by at least one controller for controlling extraction of landfill gas from a landfill via a gas extraction system comprising a plurality of wells, the method comprising: obtaining a first set of concentrations of a greenhouse gas (e.g., methane, carbon dioxide) measured by a first plurality of emissions sensors positioned at respective first fixed distances above a surface of a region comprising the plurality of wells; obtaining a second set of concentrations of the greenhouse gas measured by a second plurality of emissions sensors positioned at respective second fixed distances above the surface of the region comprising the plurality of wells, the respective second fixed distances being greater than the respective first fixed distances; determining, based on the first and second sets of concentrations of the greenhouse gas, an aggregate measure of mass flow rate of the greenhouse gas for the region comprising the plurality of wells; determining whether the aggregate measure of mass flow rate is greater than a threshold (e.g., 0.0 kg/min of the greenhouse gas per meter squared of landfill surface area, 0.0005 kg/min of the greenhouse gas per meter squared of landfill surface area); and when it is determined that the aggregate measure of mass flow rate is greater than the threshold, increasing a flow rate of landfill gas being extracted from at least one well of the plurality of wells at least in part by transmitting a control adjustment, with the at least one controller, to a valve of the at least one well causing the valve to open to a greater degree.

In some embodiments, at least some of the first and second pluralities of emissions sensors are disposed substantially directly above respective ones of the plurality of wells.

In some embodiments, at least some of the first and second pluralities of emissions sensors are distanced from respective ones of the plurality of wells in a direction substantially perpendicular to a direction in which the first fixed distance extends.

In some embodiments, the method further comprises obtaining a measure of a barometric pressure, a humidity, and/or a temperature of ambient air in the region. The determining the aggregate measure of mass flow rate may be further based on the measure of the barometric pressure, the humidity, and/or the temperature of the ambient air in the region.

In some embodiments, the respective first fixed distances above the surface of the region comprising the plurality of wells at which the first plurality of emissions sensors is positioned are substantially the same. In some embodiments, the respective first fixed distances above the surface of the region comprising the plurality of wells at which the first plurality of emissions sensors is positioned are the same.

In some embodiments, the respective second fixed distances above the surface of the region comprising the plurality of wells at which the second plurality of emissions sensors is positioned are substantially the same. In some embodiments, the respective second fixed distances above the surface of the region comprising the plurality of wells at which the second plurality of emissions sensors is positioned are the same.

Some embodiments provide for a control system for controlling extraction of landfill gas from a landfill via a gas extraction system comprising a plurality of wells, the control system comprising: at least one controller configured to: obtain a first set of concentrations of a greenhouse gas (e.g., methane, carbon dioxide) measured by a first plurality of emissions sensors positioned at respective first fixed distances above a surface of a region comprising the plurality of wells; obtain a second set of concentrations of the greenhouse gas measured by a second plurality of emissions sensors positioned at respective second fixed distances above the surface of the region comprising the plurality of wells, the respective second fixed distances being greater than the respective first fixed distances; determine, based on the first and second sets of concentrations of the greenhouse gas, an aggregate measure of mass flow rate of the greenhouse gas for the region comprising the plurality of wells; determine whether the aggregate measure of mass flow rate is greater than a threshold; and when it is determined that the aggregate measure of mass flow rate is greater than the threshold (e.g., 0.0 kg/min of the greenhouse gas per meter squared of landfill surface area, 0.0005 kg/min of the greenhouse gas per meter squared of landfill surface area), increase a flow rate of landfill gas being extracted from at least one well of the plurality of wells at least in part by transmitting, with the at least one controller, a control adjustment to a valve of the at least one well causing the valve to open to a greater degree.

Some embodiments provide for at least one non-transitory computer-readable storage medium having executable instructions encoded thereon, that, when executed by at least one controller, cause the at least one controller to perform a method for controlling extraction of landfill gas via a gas extraction system comprising a plurality of wells, the method comprising: with the at least one controller: obtaining a first set of concentrations of a greenhouse gas measured by a first set of emissions sensors positioned at respective first fixed distances above a surface of a region comprising the plurality of wells; obtaining a second set of concentrations of the greenhouse gas measured by a second set of emissions sensors positioned at respective second fixed distances above the surface of the region comprising the plurality of wells, the respective second fixed distances being greater than the respective first fixed distances; determining, based on the first and second sets of concentrations of the greenhouse gas, an aggregate measure of mass flow rate of the greenhouse gas for the region comprising the plurality of wells; determining whether the aggregate measure of mass flow rate is greater than a threshold; and when it is determined that the aggregate measure of mass flow rate is greater than the threshold, increasing a flow rate of landfill gas being extracted from at least one well of the plurality of wells at least in part by transmitting, with the at least one controller, a control adjustment to a valve of the at least one well causing the valve to open to a greater degree.

The aspects and embodiments described above, as well as additional aspects and embodiments, are described further below. These aspects and/or embodiments may be used individually, all together, or in any combination, as the application is not limited in this respect.

II. Example Systems for Performing Landfill Gas Extraction

FIG. 1 illustrates an example environment 100 in which aspects of the technology described herein may be implemented. The illustrative environment 100 includes a landfill 102 which holds decomposing waste 104. The decomposing waste 104 produces landfill gas 106 which is extracted through a gas extraction well 108. The gas extraction well includes a wellhead 110 through which a control system 112 is coupled to the gas extraction well 108. The control system 112 may be configured to control extraction of gas via the gas extraction well 108. A gas collection system 114 collects the landfill gas 106 extracted through the gas extraction well 108. The gas collection system 114 supplies the extracted landfill gas to a power plant 116. Although in the example embodiment shown in FIG. 1, a single wellhead 110 is shown, in some embodiments, the environment 100 may include multiple wellheads at multiple sites. In such embodiments, the landfill gas may be extracted from the multiple sites.

In some embodiments, the gas collection system 114 includes a vacuum source. The vacuum source generates a negative pressure differential between the gas collection system 114 and the landfill 102. The negative pressure differential causes the landfill gas 106 to flow from the landfill 102 to the gas collection system 114 through the gas extraction well 108. In some embodiments, the gas collection system 114 may comprise an additional location where extracted landfill gas is stored, and where the extracted landfill gas may be treated (e.g., by removing impurities) before being supplied to the power plant or to the pipeline infrastructure 116. The power plant 116 may be configured to convert the extracted landfill gas into electrical power. For example, the power plant 116 may be configured to burn the extracted landfill gas to turn a rotor of an electricity generator or a turbine.

It should be appreciated, that although FIG. 1 illustrates supplying of extracted landfill gas from the collection system 114 to a power plant 116, the extracted landfill gas may additionally or alternatively be supplied to one or more other locations, and/or used for other purposes. For example, the gas collection system 114 may be configured to supply gas to existing gas pipelines, boilers, greenhouses, heating units, and/or other locations, as aspects of the technology described herein are not limited with respect to where the extracted landfill gas is supplied.

In some embodiments, the control system 112 controls extraction of the landfill gas 106 through the gas extraction well 108. In some embodiments, the control system 112 may be configured to operate to control extraction of landfill gas to achieve a desired outcome or outcomes with respect to energy content of extracted landfill gas, composition of extracted landfill gas, flow rate of gas extraction, regulatory requirements, and/or other parameters. In some embodiments, the control system 112 may include multiple components that operate to achieve the outcome(s), as discussed in more detail herein.

Figure 2:
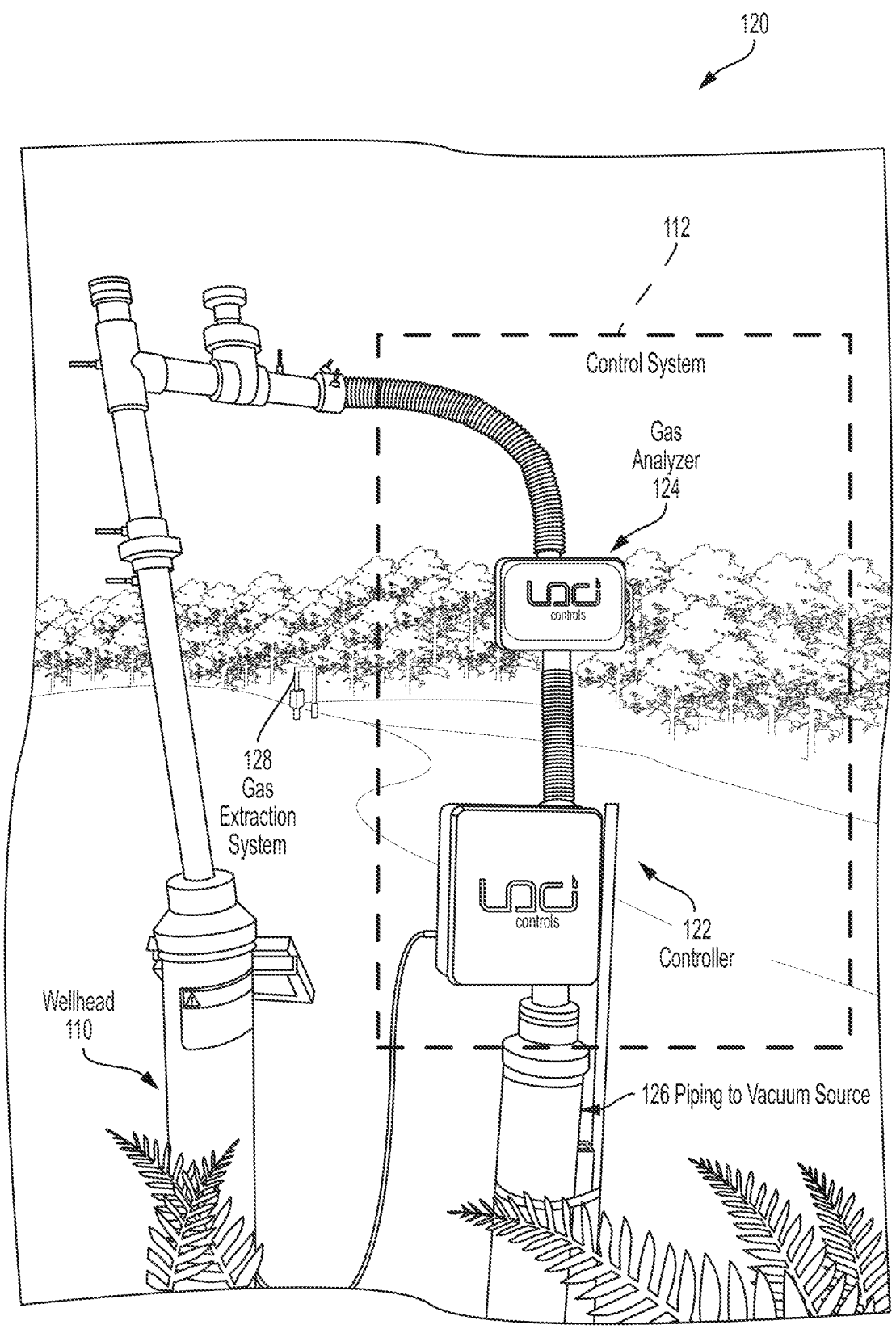
FIG. 2 shows an example control system for landfill gas extraction, according to some embodiments.

FIG. 2 illustrates an example implementation of the control system 112 for a landfill gas extraction system 120. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. The control system 112 includes a gas analyzer 124 which the control system 112 uses to determine one or more characteristics of the extracted landfill gas. The control system 112 includes a controller 122 that uses the determined characteristic(s) to control extraction of landfill gas. In some embodiments, the controller 122 may be configured to use the measured characteristic(s) to control a flow rate of landfill gas extraction. For example, the controller 122 may be configured to use the measured characteristic(s) to control a position of a valve that controls the flow rate of landfill gas being extracted.

In some embodiments, the gas analyzer 124 may be configured to collect and analyze extracted landfill gas. The gas analyzer 124 may be configured to include one or more sensors to measure the characteristic(s) of the extracted landfill gas. In some embodiments, the gas analyzer 124 may be configured to use the sensor(s) to measure composition, temperature, and/or other characteristic of the extracted landfill gas. In some embodiments, the gas analyzer may be configured to use the sensor(s) to measure the characteristic(s) of landfill gas when the gas is extracted (e.g., before being analyzed by the gas analyzer 124). The sensor(s) may comprise, for example, infrared sensors, catalytic beads, electrochemical sensors, photoionization detectors, zirconium oxide sensors, thermal conductive detectors, and/or any other suitable sensing technology for measuring the characteristic(s) of the landfill gas, as aspects of the technology described herein are not limited to using a particular type of sensor.

In some embodiments, the gas analyzer 124 may be configured to heat the landfill gas within gas composition chamber prior to measuring the characteristic(s) to obtain more accurate and/or consistent measurements of the characteristic(s). In some embodiments, the gas analyzer 124 may be configured to heat the extracted landfill gas prior to measuring the characteristic(s) of the landfill gas. In some embodiments, the gas analyzer 124 may be configured to heat the extracted landfill gas to a temperature that is a threshold temperature (e.g., 1 degree Celsius, 10 degrees Celsius, 25 degrees Celsius) greater than a temperature of the gas in the landfill and/or a temperature of the gas when it is extracted. The gas analyzer 124 may be configured to obtain measurements of the characteristic(s) of the extracted landfill gas at the higher temperature. By heating the extracted landfill gas in this manner prior to measuring the characteristic(s), the obtained measurements may be more accurate and precise. Further, the warmer landfill gas may reduce deterioration of hardware components in the gas analyzer 124 by preventing condensation of water vapor on the hardware components.

In some embodiments, the gas analyzer 124 may be configured to additionally or alternatively treat the gas sample in other ways. For example, the gas analyzer 124 may be configured to treat a gas sample by cooling the gas sample, and/or drying the gas sample. In another example, the gas analyzer 124 may be configured to filter the gas to remove particles, filter the gas to remove contaminants or other chemicals, pressurize the gas, de-pressurize the gas, or treating the gas in another manner. In some embodiments, the gas analyzer 124 may be configured to obtain measurements of the characteristic(s) of a landfill gas sample after treating the gas sample.

In some embodiments, the gas analyzer 124 may be configured to determine one or more characteristics of the environment (e.g., ambient temperature, atmospheric pressure, wind direction, wind speed, precipitation, humidity), and/or gas in the landfill (e.g., temperature, composition, humidity). The gas analyzer 124 may include one or more sensors to obtain measurements of the characteristic(s). The sensors can include, for example, temperature sensors, humidity sensors, pH sensors, pressure sensors and/or any other type of sensor(s) for sensing environmental characteristics.

In some embodiments, the controller 122 may be configured to control one or more parameters of landfill gas extraction. In some embodiments, the controller 122 may be configured to control a flow rate of landfill gas being extracted from the landfill 102. In some embodiments, the control system 112 may include a flow control mechanism to control a flow rate of landfill gas extraction. For example, the control system 112 may include one or more valves and a valve actuator for changing the position of the valve(s) to control the flow rate. The controller 122 may be configured to determine and apply settings to the valve(s) to control the flow rate of landfill gas extraction (e.g., operate the valve actuator to change the position of the valve to a determined position). In some embodiments, the control mechanism is placed between the gas extraction well 108 and the gas collection system 114 such that gas being extracted through the gas extraction well 108 flows through the control mechanism on its way to the gas collection system 114.

In some embodiments, the controller 122 may be coupled to the gas analyzer 124. The controller 122 may be configured to use measurements obtained by the gas analyzer 124 to determine the control parameter(s). In some embodiments, the controller 122 may be configured to regulate the landfill gas flow rate based on the measurements obtained by the gas analyzer 124. To adjust the flow rate, in some embodiments, the controller 122 may be configured to adjust a valve position to modify the flow rate. The controller 122 may be configured to control a valve actuator (e.g., a valve drive buffer) to move the position of the valve in order to obtain a position. In some embodiments, the controller 122 may be configured to determine a target flow rate based on the measurements of the characteristic(s) obtained by the gas analyzer 124. The controller 122 may be configured to adjust the control mechanism (e.g., valve position) such that the flow rate is the target flow rate.

In some embodiments, the control system 112 may be configured to determine a measure of energy content of landfill gas being extracted from the landfill 102. The gas analyzer 124 may be configured to obtain a measurement of concentration of methane in extracted landfill gas. The controller 122 may be configured to determine a flow rate of the gas being extracted from the landfill. The control system 112 may be configured to determine an energy content of the landfill gas being extracted from the landfill 102 based on the concentration of methane and the flow rate. The controller may be configured to determine a target energy content of landfill gas being extracted from the landfill 102 and control a flow control mechanism to set the flow rate such that the energy content of the landfill gas being extracted reaches the target energy content.

Example systems and techniques for controlling extraction of landfill gas are further described in U.S. Pat. No. 10,449,578 entitled "DEVICES AND TECHNIQUES RELATING TO LANDFILL GAS EXTRACTION" filed on Mar. 13, 2017 and issued on Oct. 22, 2019, U.S. Pat. No. 10,576,514 entitled "DEVICES AND TECHNIQUES RELATING TO LANDFILL GAS EXTRACTION" filed on Apr. 21, 2017 and issued on Mar. 3, 2020, U.S. patent application Ser. No. 16/589,372 entitled "LANDFILL GAS EXTRACTION SYSTEMS AND METHODS" filed on Oct. 1, 2019 each of which are incorporated by reference herein in their entireties. Some embodiments may include one or more features of embodiments described in the referenced applications.

In some embodiments, multiple wells or gas extraction systems may be located at a landfill to extract gas from the landfill. For example, FIG. 2 illustrates another well and gas extraction system 128 located at the landfill. In some embodiments, multiple gas extraction systems at the landfill may include the control system 112 for controlling extraction of landfill gas from the landfill. For example, gas extraction system may include the control system 112 to control extraction of landfill gas via the gas extraction system 128.

Although the gas analyzer 124 and the controller 122 are shown as separate components in FIG. 1, in some embodiments, the gas analyzer 124 and controller 122 may be portions of a single unit. Some embodiments are not limited to any particular arrangement or combination of the gas analyzer 124 and the controller 122. Furthermore, functionality described for each of the gas analyzer 124 and the controller 122 may be interchanged between the two components, as some embodiments of the technology described herein are not limited in this respect.

Figure 3:
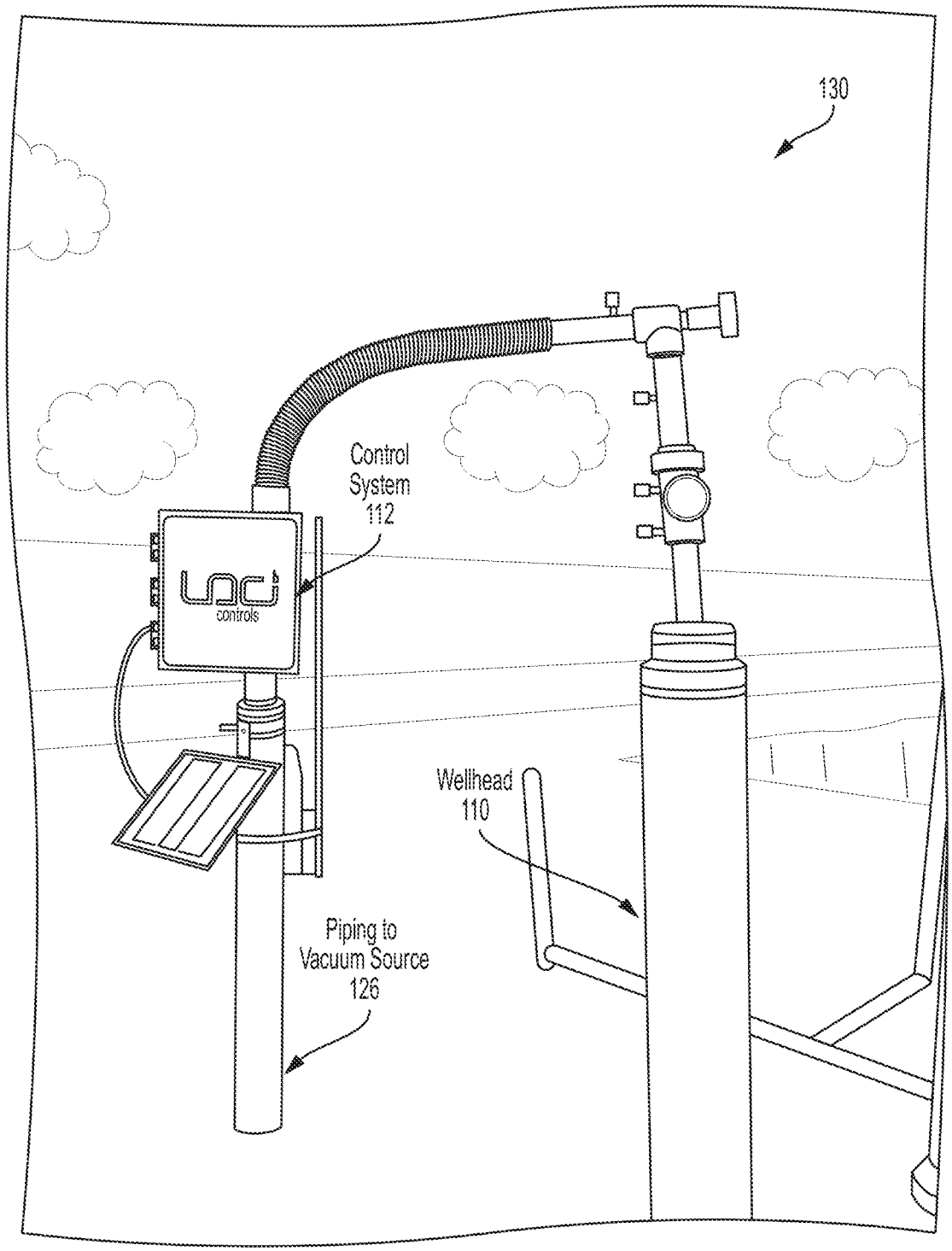
FIG. 3 shows another example control system for landfill gas extraction, according to some embodiments.

FIG. 3 illustrates an example implementation of the control system 112 for a landfill gas extraction system 130. In some embodiments, the gas analyzer and the controller described with reference to FIG. 2 are portions of the control system 112 shown in FIG. 3. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. In some embodiments, the control system 112 may be configured to operate as described above with reference to FIG. 2. For example, the control system 112 may be configured to use a gas analyzer and controller in the control system 112 to obtain measurements of one or more characteristics of the landfill gas being extracted via the gas extraction system and control extraction of the gas based on the measurements of the characteristic(s).

Figure 4:
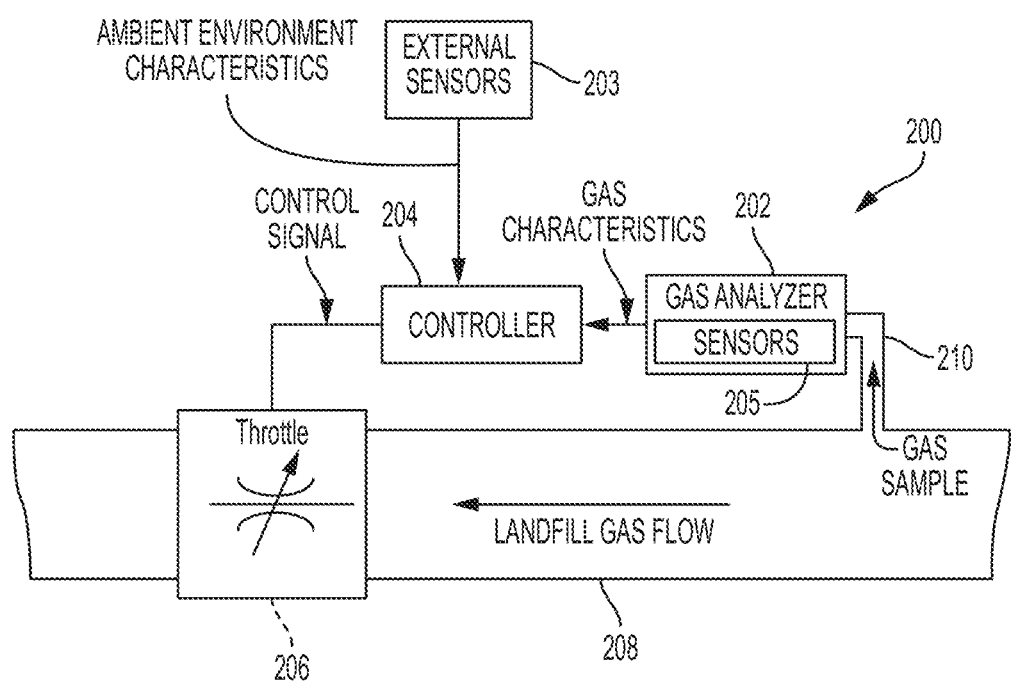
FIG. 4 is a block diagram illustrating an in situ control mechanism for landfill gas extraction, according to some embodiments.

A block diagram of some embodiments of an In Situ Control Mechanism 200 is presented in FIG. 4. In some embodiments, an In Situ Control Mechanism may include one or more mechanisms configured to control the flow of landfill gas from one or more wells to gas collection system 110 through gas extraction piping system 108. Any suitable flow-control mechanism 206 may be used, including, without limitation, a valve (e.g., a solenoid valve, latching solenoid valve, pinch valve, ball valve, butterfly valve, ceramic disc valve, check valves, choke valves, diaphragm valves, gate valves, globe valves, knife valves, needle valves, pinch valve, piston valve, plug valve, poppet valve, spool valve, thermal expansion valve, pressure reducing valve, sampling valve, safety valve) and/or any other suitable type of flow-control mechanism.

In some embodiments, an In Situ Control Mechanism may include one or more actuation devices configured to control operation of the one or more flow-control mechanisms (e.g., to open a flow-control mechanism, close a flow-control mechanism, and/or adjust a setting of a flow-control mechanism). In some embodiments, an In Situ Control Mechanism may include a controller 204 configured to determine the settings to be applied to the one or more flow-control mechanisms (e.g., via the actuation devices), and/or configured to apply the settings to the one or more flow-control mechanisms (e.g., via the actuation devices). In some embodiments, the settings to be applied to the one or more flow-control mechanisms (e.g., via the actuation devices) may be determined remotely and communicated to the In Situ Control Mechanism (e.g., by a remotely located controller) using any suitable communication technique, including, without limitation, wireless communication, wired communication, and/or power line communication.

In some embodiments, an In Situ Control Mechanism may include one or more sensor devices configured to sense one or more attributes associated with the landfill, including, without limitation, attributes of the landfill, attributes of the landfill gas, attributes of an area adjacent to the landfill, and/or attributes of the landfill's gas extraction system. In some embodiments, the In Situ Control Mechanism may include one or more actuation devices configured to control operation of the one or more sensor devices (e.g., to activate a sensor device, deactivate a sensor device, and/or collect data from the sensor device). In some embodiments, an In Situ Control Mechanism may include a controller 204 configured to determine the settings (e.g., control signals) to be applied to the one or more actuation and/or sensor devices, configured to apply the settings to the one or more actuation and/or sensor devices, and/or configured to collect data (e.g., measurements) obtained by the one or more sensor devices. In some embodiments, the settings to be applied to the one or more actuation and/or sensor devices may be determined remotely and communicated to the In Situ Control Mechanism (e.g., by a remotely located controller) using any suitable communication technique, including, without limitation, wireless communication, wired communication, and/or power line communication. In some embodiments, the In Situ Control Mechanism may communicate the one or more sensed attributes associated with the landfill (e.g., to a remotely located controller).

In some embodiments, the one or more sensor devices may include a Gas Analyzer 202. In some embodiments, a Gas Analyzer 202 may collect a sample of landfill gas from the gas extraction piping 208 through an input port 210, determine (e.g., compute, measure and/or sense) one or more characteristics of that gas, and/or report the one or more characteristics of the gas to a controller (e.g., local controller 204 and/or a remotely located controller). In some embodiments, the Gas Analyzer may determine the gas temperature, pressure, flow rate, humidity, energy content (e.g., energy density), gas composition (partial pressure or concentration of methane, oxygen, carbon dioxide, carbon monoxide, hydrogen sulfide, nitrogen and/or any other suitable gas) and/or any other characteristics of the landfill gas coming from the gas extraction well(s) upstream from the location where the In Situ Control Mechanism is installed.

Accordingly, in some embodiments, Gas Analyzer 202 may include sensors 205 configured to make such measurements. Sensors 205 may be of any suitable type. In some embodiments, sensors 205 may include a sensor configured to detect partial pressure and/or concentration of methane in landfill gas, a sensor configured to detect partial pressure and/or concentration of oxygen in landfill gas, a sensor configured to detect partial pressure and/or concentration of carbon dioxide in landfill gas, a sensor configured to detect partial pressure and/or concentration of carbon monoxide in landfill gas, a sensor configured to detect partial pressure and/or concentration of hydrogen sulfide in landfill gas, a sensor configured to detect partial pressure and/or concentration of nitrogen in landfill gas, and/or a sensor to detect partial pressure or concentration of any suitable gas in landfill gas.

In some embodiments, sensors 205 may include one or more non-dispersive infrared (NDIR) sensors, mid infrared optical sensors, catalytic beads, electrochemical sensors, pellistors, photoionization detectors, zirconium oxide sensors, thermal conductivity detectors, and/or any other sensing technology. Gas Analyzer 202 may be configured to measure flow rate by using one or more sensors 205 to determine a pressure differential across a venturi, orifice plate, or other restriction to the flow of gas; by pitot tube, mechanical flow meter, heated wire or thermal mass flow meter, and/or using any other suitable technique. Gas Analyzer 202 may be configured to measure temperature with a thermocouple, a negative or positive temperature coefficient resistor, capacitor, inductor, a semiconducting device, and/or using any other suitable technique.

In some embodiments, one or more external sensors 203 may be used to measure one or more characteristics of the ambient environment outside of Gas Analyzer 202 (e.g., outside of In Situ Control Mechanism 200). The external sensor(s) 203 may provide obtained measurements to In Situ Control Mechanism 200 (e.g., to controller 204) and/or to one or more computing devices located remotely from In Situ Control Mechanism 200 (e.g., by using a wireless link, a wired link, and/or any suitable combination of wireless and wired links). In some embodiments, external sensor(s) 203 may include one or more temperature sensors configured to measure temperature outside the control mechanism 200 (e.g., the ambient atmospheric temperature) and/or any other suitable location. In some embodiments, external sensor(s) 203 may include one or more atmospheric pressure sensor(s) configured to measure atmospheric pressure outside of the control mechanism 200 (e.g., ambient atmospheric pressure) and/or any other suitable location. In some embodiments, sensors 203 may be used to measure one or more characteristics of the ambient environment. Additionally or alternatively, in some embodiments, information about the characteristic(s) of the ambient environment may be obtained from an external data source (e.g., external forecast data, National Oceanic and Atmospheric Administration (NOAA) data for temperature and/or barometric pressure).

In some embodiments, the gas characteristics may be sampled once in each reading, or may be sampled many times and statistics about the distribution of values may be determined. The gas characteristics may be continuously determined, or they may be determined at discrete time intervals. In some embodiments, the Gas Analyzer may analyze gas in the main flow of landfill gas (e.g., within gas extraction piping 208). In some embodiments, the Gas Analyzer may draw a small sample of gas into a separate chamber for analysis. In some embodiments, certain parameters (for example flow rate, pressure, temperature, humidity, and the like) may be measured in the main gas stream (e.g., may be measured by sensors disposed directly within extraction gas piping), and others may be analyzed in a separate chamber.

In order to improve measurement accuracy, measurement resolution, measurement repeatability, sensor lifetime, and/or sensor reliability, a sample of gas from the well may be pre-treated before analysis, which pre-treatment may include heating, cooling, drying, and/or any other suitable pre-treatment processing (e.g., through forced condensation, passing through a desiccant, or any other suitable technique), filtered to remove particles, filtered to remove contaminants or other chemicals, pressurized, de-pressurized, and/or otherwise treated before being analyzed. After analyzing and reporting gas characteristics (e.g., to local controller 204 and/or to a remotely located controller), the Gas Analyzer may purge the gas sample from the chamber and vent it to the atmosphere, or return it to the main gas flow. In some embodiments, the analyzed gas sample may be purged prior to reporting the gas characteristics to a controller.

In some embodiments, the Gas Analyzer may utilize non-dispersive infrared (NDIR) sensors, catalytic beads, electrochemical sensors, pellistors, photoionization detectors, zirconium oxide sensors, thermal conductivity detectors, and/or any other sensing technology. Flow rate may be measured by a pressure differential across a venturi, orifice plate, or other restriction to the flow of gas; by pitot tube, mechanical flow meter, heated wire or thermal mass flow meter, and/or using any other suitable technique. Temperature may be measured with a thermocouple, a negative or positive temperature coefficient resistor, capacitor, inductor, a semiconducting device, and/or using any other suitable technique. Temperature may be measured inside the well, in the main gas flow from the well to the collection system, inside a sampling chamber, outside of the control mechanism (e.g., ambient atmospheric temperature), and/or at any other suitable point. Atmospheric pressure may be measured outside of the control mechanism (e.g., ambient atmospheric pressure) and/or at any other suitable location. Temperature, pressure, gas composition, and/or other readings from different points within the gas extraction well, the In Situ Control Mechanism, and/or the gas collection system may be used in conjunction with each other to obtain a more complete analysis of the operating state of the landfill gas collection system.

III. Landfill Gas Emissions Monitoring and Control

As described herein, the inventors have developed techniques for controlling landfill gas extraction based at least in part on a characteristic of at least one greenhouse gas emitted from the landfill, aspects of which are further described herein.

a. Example Systems for Landfill Gas Emissions Monitoring and Control

Figure 5A:
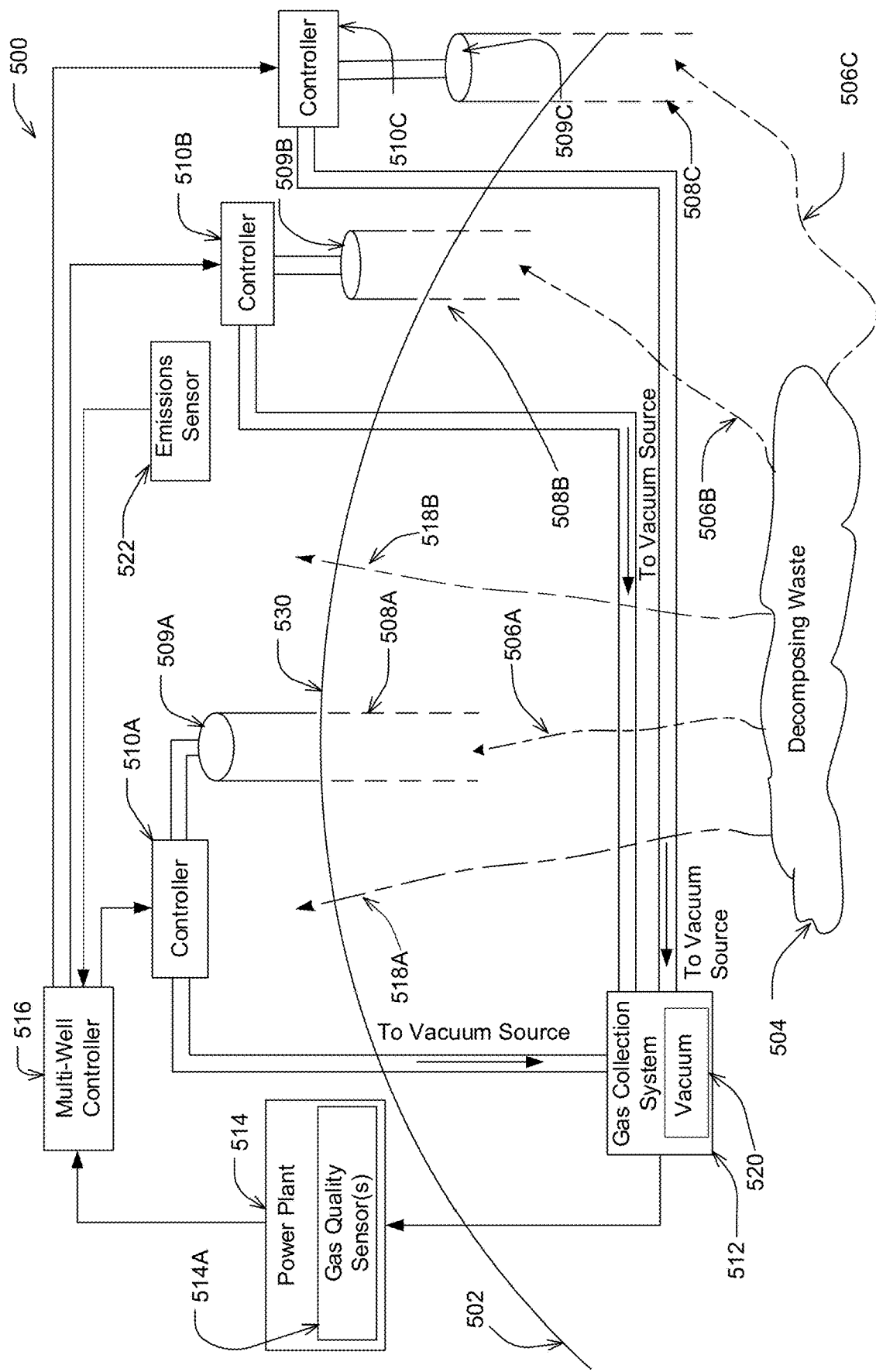
FIG. 5A is a block diagram of an example gas extraction system having a plurality of wells, according to some embodiments.

FIG. 5A is a block diagram of an example system for controlling landfill gas extraction based on landfill gas emissions characteristics. As shown in FIG. 5A, landfill gas collected from multiple different extraction wells in a landfill may be aggregated at a gas output. For example, the gas output may be a power plant that uses the aggregated landfill gas to generate electricity. In another example, the gas output may be a processing plant where landfill gas collected from the extraction wells undergoes treatment. The multiple wells may each have a valve disposed in well piping coupled to the well that modulates a flow rate of landfill gas being extracted from the well. In some embodiments, the control system may obtain a value indicating a characteristic of the landfill gas emitted from the plurality of wells (e.g., a mass flow rate of a greenhouse gas, a concentration of a greenhouse gas measured a fixed distance from a surface of the landfill), and determine whether the characteristic is outside of a target range (e.g., greater than an upper endpoint and/or less than a lower endpoint) or different from a target value for the characteristic. In response to determining that the measured characteristic is outside of the target range, for example, the control system may adjust a flow rate of landfill gas being extracted from one or more of the plurality of wells. For example, the control system may control the valves disposed in the well piping to control flow rates of landfill gas being extracted from the multiple wells. The controller may change the degree to which one or more of the valves is open to change the flow rates of one or more of the multiple gas extraction wells. In some embodiments, the control system may control flow rates of landfill gas being extracted from the multiple wells by adjusting an applied vacuum to the plurality of wells.

FIG. 5A illustrates an example environment 500 in which aspects of the technology described herein may be implemented. The environment 500 includes a landfill 502, which holds decomposing waste 504. The decomposing waste 504 produces landfill gas 506A-C which flows out from the landfill 502 through gas extraction wells 508A-C. A gas extraction well may also be referred to herein as a "well." The gas extraction wells 508A-C include respective wellheads 509A-C. Each of the gas extraction wells 508A-C is coupled to a respective one of the controllers 510A-C through the wellhead of the gas extraction well. Each of the controllers 510A-C may be configured to locally control extraction of gas from the gas extraction well that the controller is coupled to. A controller coupled to a particular well may be referred to herein as a "local controller." A gas collection system 512 collects the landfill gas extracted from the wells 508A-C. The gas collection system 512 supplies the extracted landfill gas to a power plant 514. The power plant 514 may be communicatively coupled to a multi-well controller 516. The multi-well controller 516 is communicatively coupled to the controllers 510A-C associated with wells 508A-C. The multi-well controller 516 receives, from the power plant 514, information indicating gas quality of landfill gas aggregated from the wells 508A-C. It should be appreciated that although three wells are shown in FIG. 5A, this is by way of example and not limitation, as a site may include any suitable number of wells (e.g., at least 10, at least 50, at least 100, at least 250, between 50 and 1000 wells).

The system 500 further includes at least one emissions sensor 522. The emissions sensor 522 is configured to obtain a measure of one or more characteristics of landfill gas emitted from the landfill 502. For example, as shown in FIG.

5A, in some instances, at least some landfill gas 518A, 518B penetrates a surface 530 of the landfill 502 and is emitted into the atmosphere. The landfill gas 518A, 518B being emitted into the atmosphere comprises harmful greenhouse gasses such as methane and carbon dioxide. The emissions sensor 522 is configured to measure one or more characteristics of the emitted gas 518A, 518B, and extraction of landfill gas via the plurality of wells 508A-C may be controlled based at least in part of the measured characteristics.

The emissions sensor 522 may be any suitable sensor for measuring one or more emissions characteristics. For example, in some embodiments, the emissions sensor 522 comprises at least one optical sensor such as a spectrometer, an infrared sensor, a camera, a hyperspectral imaging device, a light detection and ranging (LiDAR) sensor, any other gas composition sensor described herein, etc. In some embodiments, the emissions sensor 522 may obtain information regarding weather, atmosphere, wind, geolocation, and/or any other suitable information. In some embodiments, the optical emissions sensor 522 is an aerial sensor. The aerial sensor may be mounted to a moving object, such as an aerial vehicle (e.g., a helicopter, drone, plane, etc.). In some embodiments, the moving object is autonomous. Such aerial sensors allow for monitoring of wide-spread areas and/or areas which may be difficult to access by ground. In some embodiments, the emissions sensor additionally or alternatively comprises at least one ground-based sensor, such as a spectrometer.

In some embodiments, the emissions sensor 522 is configured to measure a mass flow rate (mass per unit time) of a greenhouse gas in landfill gas 518A, 518B being emitted from the landfill 502. For example, the emissions sensor 522 may be configured to measure a mass flow rate of methane being emitted from the landfill 502. In some embodiments, the emissions sensor 522 is configured to measure a mass flow rate of carbon dioxide being emitted from the landfill 502. In some embodiments, the emissions sensor 522 may additionally or alternatively be configured to obtain a measure of a concentration of a greenhouse gas in landfill gas 518A, 518B emitted from the landfill 502 measured at a fixed distance above the surface 530 of the landfill 502. For example, the emissions sensor 522 may be configured to obtain a concentration of methane measured a fixed distance (e.g., 1 meter) above the surface 530 of the landfill 502. In some embodiments, the emissions sensor 522 is configured to obtain a concentration of carbon dioxide measured a fixed distance (e.g., 1 meter) above the surface 530 of the landfill 502. As described herein, the emissions measurements may be used to control flow rates of one or more of the plurality of gas extraction wells 508A-C. In some embodiments, the emissions sensor 522 may be further configured to obtain location data identifying a location from which an emissions measurement was obtained. In some embodiments, the emissions sensor 522 is further configured to obtain a visual image of the location from which an emissions measurement was obtained.

For example, the emissions sensor 522 may be in communication with the multi-well controller 516 and/or one or more of the local controllers 510A-C. The emissions sensor 522 may communicate emissions measurements to the multi-well controller 516 and/or the one or more of the local controllers 510A-C which may be used to determine whether and/or how to adjust flow rates of one or more of the plurality of gas extraction wells 508A-C. In some embodiments, the emissions sensor 522 wirelessly communicates with the one or more controllers (e.g., via cloud communication or other network communication). In some embodiments, the emissions sensor 522 is in wired communication with the one or more controllers. Although not shown in FIG. 5A, in some embodiments, the emissions sensor 522 is in communication with one or more other devices, for example, a reporting interface as described herein.

The multi-well controller 516 and/or one or more of the local controllers 510A-C may send instructions to the emissions sensor 522 for controlling operation of the emissions sensor 522. For example, in some embodiments, the instructions may direct the emissions sensor 522 to obtain a measurement. In some embodiments, the instructions may direct the emissions sensor 522 to begin obtaining repeated measurements at a particular frequency (e.g., at least once per month, at least once per week, at least once per day, at least once per hour). In other embodiments, the emissions sensor 522 may be configured to obtain measurements autonomously, without receiving instructions from the one or more controllers.

In some embodiments, the emissions sensor 522 may be configured to detect the presence of a gas (e.g., a greenhouse gas such as methane, carbon dioxide, hydrogen sulfide, etc.) in a region. In some embodiments, the emissions sensor 522 may be configured to detect a mixture of gasses in a region. Detection of the presence of a greenhouse gas may facilitate detection of leaks of landfill gas that has penetrated the surface 530 of the landfill 502. The control system 500 may be configured to take corrective action in response to identification of a landfill gas leak. For example, in some embodiments, the control system 500 may transmit an alert in response to identification of a landfill gas leak. In some embodiments, the control system 500 may adjust flow rates of one or more of the plurality of wells 508A-C in response to identification of a landfill gas leak, for example, according to the techniques described herein.

The emissions sensor 522 may comprise a power source for powering the emissions sensor. In some embodiments, the power source comprises a battery. In some embodiments, the power source comprises an AC power source. In some embodiments, the emissions sensor 522 may additionally or alternatively be solar powered.

As described herein, the emissions sensor 522 may be configured to obtain emissions characteristics from a region of the landfill 502. In some embodiments, the region monitored by the emissions sensor 522 comprises a single gas extraction well. In some embodiments, the region monitored by the emissions sensor 522 comprises multiple gas extraction wells. The region monitored by the emissions sensor 522 may be a portion of the landfill 502 (e.g., 20%, 33%, 50%, more than 50%, etc.) or the entirety of the landfill 502. Although only one emissions sensor 522 is illustrated in FIG. 5A, it should be appreciated that the control system 500 may comprise multiple emissions sensors in some embodiments.

In some embodiments, the gas collection system 512 includes a vacuum source 520. The vacuum 520 generates a negative pressure differential between the gas collection system 512 and the landfill 502. The negative pressure differential causes the landfill gas 506A-C to flow from the landfill 502 to the gas collection system 512 through the wells 508A-C. The vacuum source 520 may be variable. For example, in some embodiments, the vacuum applied to the gas extraction wells 508A-C may be adjusted based on emissions characteristics measurements obtained by the at least one emissions sensor 522 by adjusting the variable vacuum 520.

In some embodiments, the gas collection system 512 may comprise an additional location where extracted landfill gas is stored, and/or where the extracted landfill gas may be treated (e.g., by removing impurities) before being supplied to the power plant 514. In some embodiments, the gas collection system 512 may include a processing plant where the collected landfill gas is treated. The landfill gas may be treated to modify concentration(s) of one or more of the gases that make up the landfill gas. In some embodiments, the processing plant may be configured to treat the landfill gas to increase an energy content of the landfill gas. For example, the landfill gas may include methane, oxygen, carbon dioxide, hydrogen sulfide, nitrogen, and other gases. The processing plant may reduce the concentration(s) of one or more non-methane gases to increase energy content (e.g., energy density) of the collected landfill gas. The power plant 514 may be configured to generate electricity using the extracted landfill gas. For example, the power plant 514 may burn the extracted landfill gas to turn a rotor of an electricity generator or a turbine. Although the gas collection system 512 and the power plant 514 are shown separately in FIG. 5A, in some embodiments, the gas collection system 512 and the power plant 514 may be components of a single system.

The power plant 514 includes one or more sensors 514A which the power plant may use to determine one or more measures of quality of extracted landfill gas. The landfill gas may be collected from multiple wells at the landfill 502, such as wells 508A-C. In some embodiments, the sensor(s) 514A may be configured to measure an energy content (e.g., energy density) of collected landfill gas. For example, the sensor(s) 514A may include a gas chromatograph that measures concentrations of one or more of the gases that make up the collected landfill gas (one or more of oxygen, nitrogen, methane, carbon dioxide, hydrogen sulfide, for example).

In some embodiments, each of the local controllers 510A-C controls extraction of landfill gas locally at a respective one of the gas extraction wells 508A-C. Each of the local controllers 510A-C may be configured to operate to control extraction of landfill gas according to a local control method, for example, to achieve a target of energy content of extracted landfill gas, composition of extracted landfill gas, flow rate of gas extraction, regulatory requirements, and/or other parameters. In some embodiments, the controller may be configured to control a flow rate of landfill gas being extracted from the well. For example, the controller may be configured to control a position of a valve disposed in well-piping of the well which in turn modulates a flow rate of landfill gas being extracted from the well. Example operation of a controller is described above with reference to FIGS. 1-3. A local controller may also be referred to herein as an "in-situ control mechanism."

In some embodiments, the multi-well controller 516 controls extraction of landfill gas globally across multiple gas extraction wells, including the gas extraction wells 508A-C. In some embodiments, the multi-well controller 516 may be configured to concurrently control extraction of landfill gas from multiple wells. Concurrently controlling extraction of landfill gas from multiple wells may involve causing an adjustment in a valve at a first well during a first time period, and in a valve at a second well during a second time period that at least partially overlaps with the first time period. In some embodiments, the multi-well controller 516 may be configured to concurrently control extraction of landfill gas from multiple wells while a respective local controller 510A-C controls extraction of landfill gas from a respective gas extraction well according to a local control method.

In some embodiments, each of the controllers 510A-C may include a valve whose position controls a flow rate of landfill gas being extracted from a respective well. The multi-well controller 516 may control the positions of the valves of the controllers 510A-C to control, globally, flow rates of landfill gas being extracted from the wells 508A-C. In some embodiments, the multi-well controller 516 may be configured to control the positions of the valves of the controllers 510A-C by transmitting a control variable to each of the controllers 510A-C. Each of the controllers 510A-C uses the control variable to determine an adjustment to make to the degree that the valve being controlled by the controller is open. In some embodiments, the multi-well controller 516 may transmit a valve position adjustment to each of the controllers 510A-C. The controllers 510A-C may be configured to apply the received adjustment to the respective valves. In other embodiments, the local controllers 510A-C may be configured to determine and apply control adjustments to the positions of the respective valves without input from the multi-well controller 516.

In some embodiments, the multi-well controller 516 may comprise at least one computer. The at least one computer may communicate with the controllers 510A-C. In some embodiments, the multi-well controller 516 may be configured to periodically transmit one or more control inputs to the controllers 510A-C. In some embodiments, the multi-well controller 516 may wirelessly transmit the control input(s) to the controllers 510A-C. In some embodiments, the multi-well controller 516 may communicate with the controllers 510A-C over wired connections.

Figure 5B:
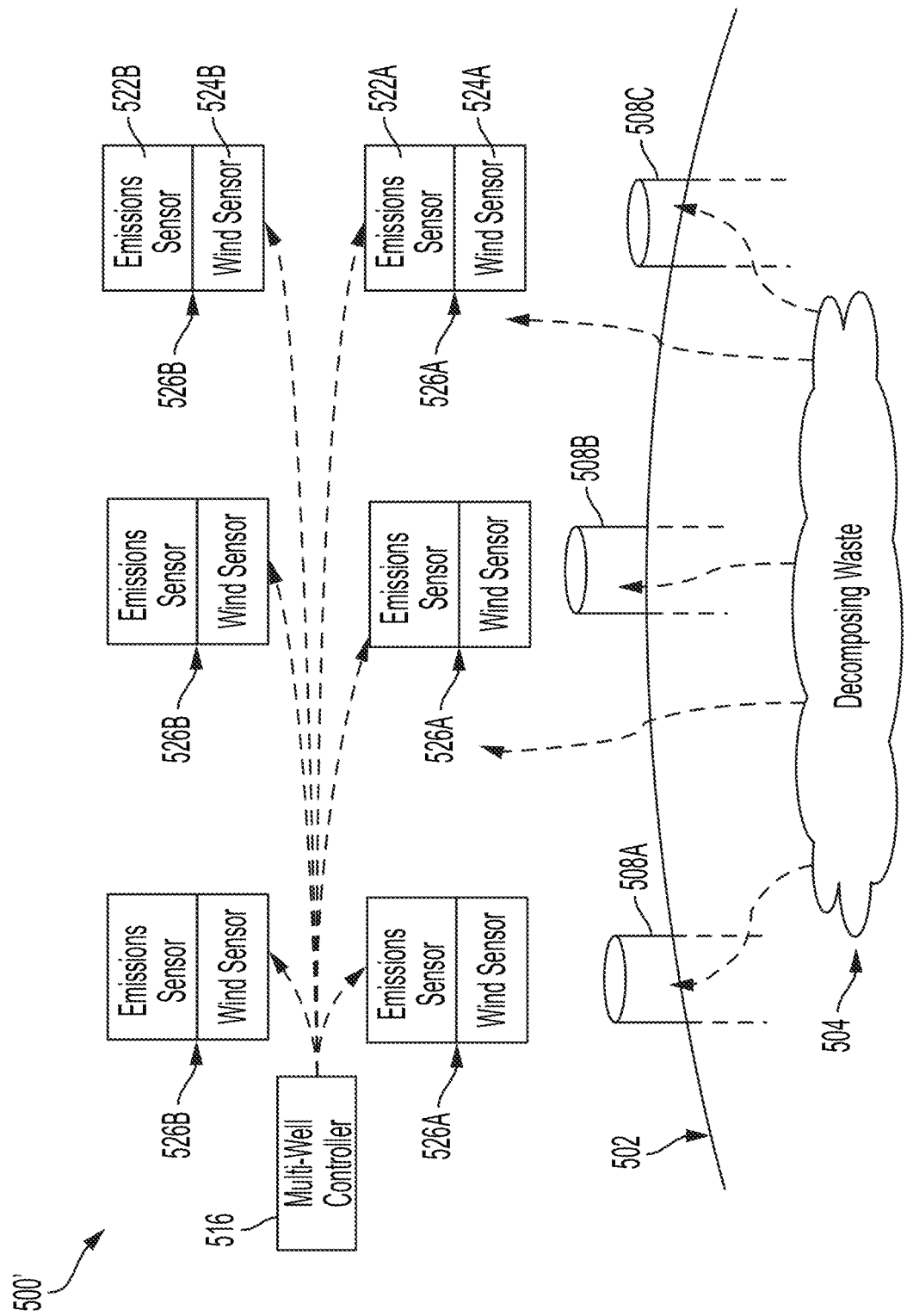
FIG. 5B is a block diagram illustrating further aspects of the example gas extraction system of FIG. 5A, according to some embodiments.

FIG. 5B is a block diagram illustrating further aspects of the example gas extraction system of FIG. 5A, according to some embodiments. As shown in FIG. 5B, in some embodiments, the environment 500' may comprise multiple emissions sensors 522A, 522B. The emissions sensors 522A, 522B may be of the type described herein with respect to emissions sensor 522 in FIG. 5A. For example, the emissions sensors 522A, 522B may be configured to measure a concentration of a gas (e.g., a gas emitted from the landfill as a result of the decomposing waste 504). In some embodiments, the gas comprises a greenhouse gas such as methane, carbon dioxide, hydrogen sulfide, nitrogen and/or benzene.

Each emissions sensor 522A, 522B may be disposed at a height above the surface of the landfill 502. In some embodiments, a first set of emissions sensors 522A are disposed at a same (or substantially the same) first height above the surface of the landfill 502. In some embodiments, the emissions sensors 522A are disposed at different known heights. In some embodiments, a second set of emissions sensors 522B are disposed at respective second heights above the landfill, the second height being greater than the first height, as shown in FIG. 5B. The respective second heights may be the substantially the same, the same, or different. Accordingly, emissions measurements (e.g., a measure of a concentration of a greenhouse gas) may be obtained at multiple locations and/or multiple heights.

In the illustrated embodiment of FIG. 5B, three gas extraction wells 508A-C are shown. In some embodiments, there may be an emissions sensor 522A, 522B disposed above each respective gas extraction well 508A-C. In some embodiments, one or more emissions sensors 522A, 522B may alternatively or additionally be disposed between gas extraction wells 508A-C. For example, one or more emissions sensors 522A, 522B may be disposed at least a minimum distance (e.g., in a direction perpendicular to the height above the surface of the landfill) away from one or more of the gas extraction wells 508A-C. In some embodiments, one or more emissions sensors may be disposed no more than a maximum distance (e.g., in a direction perpendicular to the height above the surface of the landfill) away from one or more of the gas extraction wells 508A-C.

The inventors have recognized that ambient air in a region directly above one of the one or more gas extraction wells 508A-C may contain a higher concentration of greenhouse gasses than ambient air in the region of the landfill on average. Accordingly, obtaining emissions measurements from emissions sensors disposed between the gas extraction wells 508A-C may provide more accurate emissions measurements (e.g., measurements that are more characteristic of the average concentration of a particular greenhouse gas in the region above the surface of the landfill).

In some embodiments, the one or more emissions sensors 522A, 522B may be calibrated to ensure accurate emissions measurements. For example, the calibration techniques described in U.S. patent Ser. No. 11/067,549 entitled "DESIGNS FOR ENHANCED RELIABILITY AND CALIBRATION OF LANDFILL GAS MEASUREMENT AND CONTROL DEVICES" filed on Apr. 4, 2017, and issued on Jul. 20, 2021, which is incorporated by reference herein in its entirety, may be used. For example, in some embodiments, multiple calibration gasses (e.g., a zero and a span) may be used. The inventors have appreciated that ambient air may, in some embodiments, not be a suitable gas for calibrating the emissions sensor given that ambient air may be the target sample to be measured by the emissions sensor. Accordingly, the emissions sensors may, in some embodiments, be calibrated with one or more (e.g., two) calibration gasses other than ambient air.

In some embodiments, one or more of the emissions sensors 522A, 522B may be part of a sensor system 526A, 526B. The sensor system 526A, 526B may comprise additional sensors for measuring characteristics of the ambient air at the height of the emissions sensors 522A, 522B above the surface of the landfill.

In the illustrated embodiment of FIG. 5B, the sensor systems 526A, 526B further comprise wind sensors 524A, 524B. The wind sensors 524A, 524B may measure one or more characteristics of wind in the region of the landfill (e.g., wind speed, wind direction). Any suitable type of wind sensor may be implemented (e.g., an anemometer comprising an ultrasonic transducer such as an ultrasonic transducer anemometer manufactured by Taidacent or Gill Instruments, a sonic anemometer such as a sonic anemometer manufactured by Davis Instruments).

In some embodiments, the sensor systems 526A, 526B may comprise one or more barometric pressure sensors for measuring a pressure of ambient air above the surface of the landfill. In some embodiments, the sensor systems 526A, 526B may comprise one or more temperature sensors for measuring a temperature of ambient air above the surface of the landfill. In some embodiments, the sensor systems 526A, 526B may comprise one or more humidity sensors for measuring a humidity of ambient air above the surface of the landfill. The inventors have recognized that the humidity and temperature of ambient air above the surface of the landfill may impact the percent of water vapor in the ambient air and therefore may impact the concentration of greenhouse gases in the ambient air.

The inventors have recognized that implementing multiple emissions sensors in the environment 500' enables obtaining a measure of gas emissions concentration and/or mass flow rate over an entire region of the landfill. In particular, measurements from each of the sensor systems 526A, 526B may be aggregated to obtain an estimate of greenhouse gas emissions (e.g., a concentration and/or mass flow rate of a greenhouse gas) above the surface of the landfill in a region which may comprise multiple gas extraction wells 508A-C.

The sensor systems 526A, 526B may communicate with multi-well controller 516 (e.g., to transmit instructions from the multi-well controller 516 to sensor systems 526A, 526B and/or to communicate measurements obtained by the sensor systems 526A, 526B to multi-well controller 516). In some embodiments, the multi-well controller 516 is in wired communication with one or more of the sensor systems 526A, 526B. In some embodiments, the multi-well controller 516 wirelessly communicates with one or more of the sensor systems 526A, 526B (e.g., via cellular or radio communications, over Bluetooth, etc.). In some embodiments, the multi-well controller 516 may be configured to use measurements obtained by the sensor systems 526A, 526B in computations (e.g., computations performed over the cloud), as described herein.

b. Example Techniques for Landfill Gas Emissions Monitoring and Control

As described herein, the inventors have recognized that techniques which base control of landfill gas extraction directly on measurements of emissions characteristics may provide for a more efficient reduction greenhouse gas emissions from a landfill while also maintaining the quality of extracted landfill gas. Examples techniques for landfill gas emissions monitoring and control are provided herein, and may be implemented using the control system 500 shown in FIG. 5A, for example. In some embodiments, the emissions-based techniques for landfill gas extraction control may be performed autonomously without the need for manual intervention.

Figure 6A:
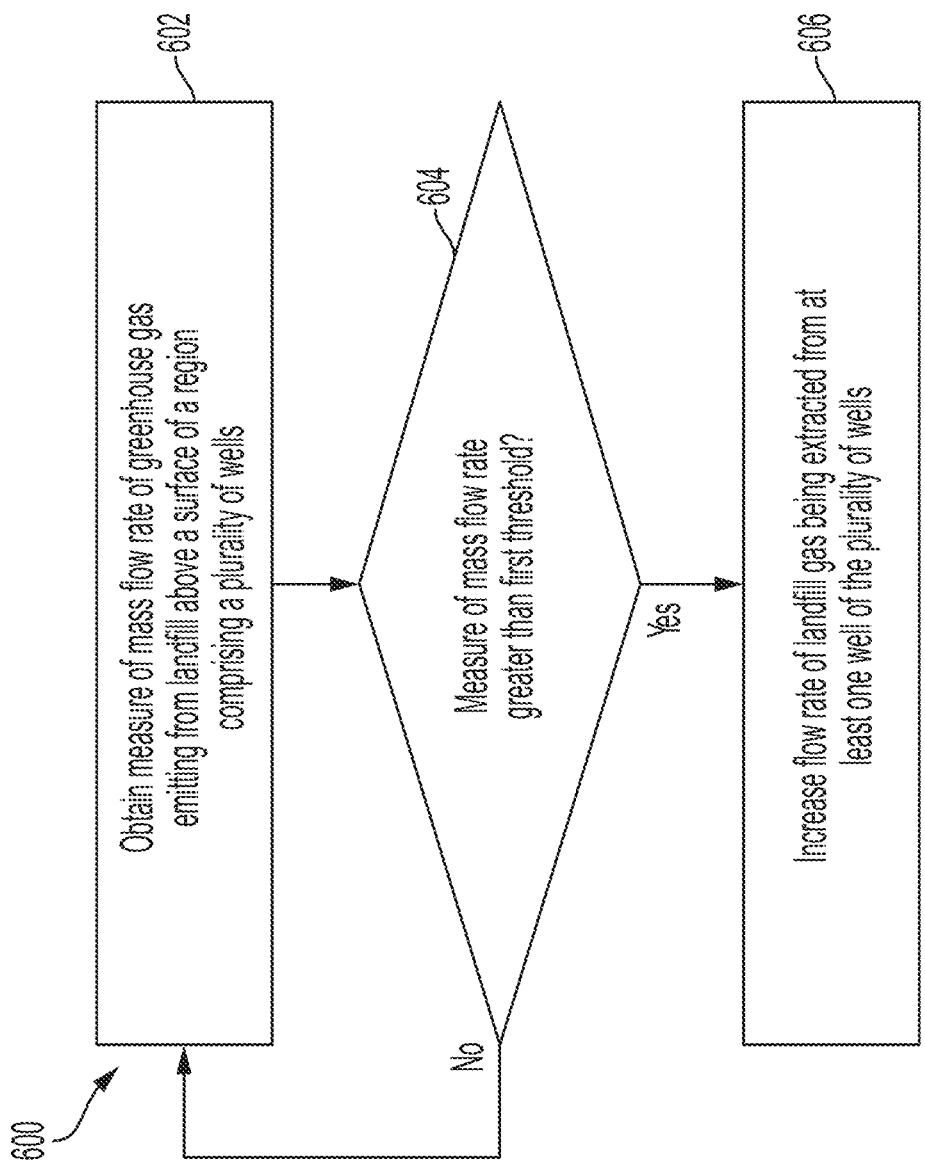
FIG. 6A is a flowchart of an illustrative process for emissions-based control of landfill gas extraction, according to some embodiments.

For example, FIG. 6A is a flowchart of an illustrative process for emissions-based control of landfill gas extraction, according to some embodiments. Process 600 uses a measure of mass flow rate, or mass per unit time, of a greenhouse gas to control a flow rate of at least one well in a landfill comprising a plurality of wells.

Process 600 begins at act 602 where a measure of mass flow rate of a greenhouse gas being emitted from the landfill is obtained. The measure of mass flow rate may be obtained by one or more emissions sensors, for example, emissions sensor 522 described herein. The greenhouse gas may comprise any greenhouse gas desired to be monitored, for example, methane, carbon dioxide, nitrogen, hydrogen sulfide, any other gas present in the emitted landfill gas and/or a combination thereof.

The measure of mass flow rate may be obtained above a surface of the landfill using the one or more emissions sensors. In some embodiments, the measure of mass flow rate is obtained for a region comprising a plurality of wells. In some embodiments, the plurality of wells comprises a portion of wells in the landfill (e.g., 20%, 50% of wells, etc.). In other embodiments, the plurality of wells includes all of the gas extraction wells disposed in the landfill. In some embodiments, the measure of mass flow rate is obtained for a region comprising only a single well.

In some embodiments, one or more sensors (e.g., the emissions sensor 522) may be configured to obtain a flow rate of a greenhouse gas being emitted from the landfill and a density of the greenhouse gas in the region above the surface of the landfill. The measure of mass flow rate may be obtained by multiply the flow rate of the greenhouse gas by the density of the greenhouse gas.

At act 604, the measure of mass flow rate obtained at act 602 is compared to a first threshold to determine whether the measure of mass flow rate is greater than the first threshold. As described herein, the inventors have appreciated that it may be desirable to limit the mass flow rate of greenhouse gasses being emitted from a landfill. Thus, the process 600 may include determining whether a mass flow rate of a particular greenhouse gas exceeds a threshold.

In some embodiments, where the greenhouse gas comprises methane, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises carbon dioxide, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold or any other suitable threshold In some embodiments, where the greenhouse gas comprises nitrogen, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises hydrogen sulfide, the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold. In some embodiments, where the greenhouse gas comprises a combination of constituent gases present in landfill gas (e.g., methane, carbon dioxide, nitrogen, benzene and/or hydrogen sulfide), the first threshold comprises 1 kg/s, 2 kg/s, 3 kg/s, 4 kg/s, 5 kg/s, 0.00004 kg/min, 0.00005 kg/min, 0.00010 kg/min, 0.000004 kg/min, 0.000005 kg/min, 0.00001 kg/min, 0.0 kg/min per meter squared of landfill surface area, or any other suitable threshold.

If, at act 604, it is determined that the measure of mass flow rate of the greenhouse gas obtained at act 602 is not greater than (e.g., less than, less than or equal to) the first threshold, no changes may be made to the flow rate of landfill gas being extracted from the plurality of wells (e.g., a position of a valve of the at least one well may be maintained). The process 600 may return through the no branch to act 602 where another measure of mass flow rate is obtained. Alternatively, the process 600 may end.

If, at act 604, it is determined that the measure of mass flow rate of the greenhouse gas obtained at act 602 is greater than the first threshold, the process 600 may proceed through the yes branch to act 606. At act 606, a flow rate of landfill gas being extracted from at least one well of the plurality of wells may be increased. When a flow rate of landfill gas extracted from the landfill via a well is too low, decomposition processes in the landfill generate landfill gas at a rate higher than the rate of landfill gas extraction allowing excess landfill gas accumulates at the bottom of the landfill. The accumulated landfill gas rises to the surface of the landfill and emits into the atmosphere. Increasing the flow rate of landfill gas being extracted from the at least one gas extraction well equilibrates the rate of landfill gas extraction and the rate of landfill gas production to prevent excess landfill gas from accumulating and penetrating the surface of the landfill.

In some embodiments, increasing a flow rate of landfill gas being extracted from the at least one well comprises increasing a degree to which a valve of the at least one well is open. As described herein, a vacuum may be applied to one or more of a plurality of gas extraction wells to generate a negative pressure in well piping. The negative pressure pulls landfill gas from the landfill into the well piping and through the well to a collection point. A valve may be disposed in the well piping to control the pressure applied to a portion of the well piping through which landfill gas can enter (referred to as a portion of the well piping upstream of the valve). A portion of well piping between the vacuum source and the valve may be referred to as the portion of well piping downstream of the valve. Increasing a degree to which the valve is open increases pressure upstream of the valve while lowering pressure downstream of the valve. The increased pressure upstream of the valve pulls more landfill gas into the well piping thereby increasing a flow rate of landfill gas being extracted by the at least one well. In some embodiments, the flow rate of landfill gas extraction may additionally or alternatively be adjusted by increasing or decreasing a vacuum applied by the control system.

As described herein, at act 606, the flow rate of landfill gas being extracted from at least one well may be adjusted. In some embodiments, act 606 comprises adjusting the flow rate of a single well. In some embodiments, act 606 comprises adjusting the flow rate of multiple wells (e.g., a portion of or all of the wells in the region from which the emissions measurement was obtained, a portion or all of the wells in the landfill). Techniques for selecting which wells to adjust in response to determining that the measure of mass flow rate obtained at act 604 is greater than the first threshold are further described herein.

In some embodiments, an error check may be performed before increasing the flow rate of the at least one well at act 606. For example, before increasing the flow rate of the at least one well, it may be determined that it is safe to do so, for example, by checking a concentration of the landfill gas being extracted from the at least one well in comparison to a target and/or one or more thresholds, checking a pressure of the well piping downstream and/or upstream of the valve in comparison to a target and/or one or more thresholds, checking a liquid level in the at least one well in comparison to a target and/or one or more thresholds, etc. Further aspects of techniques for performing an error check before increasing the flow rate of the at least one well are described herein.

Subsequent to act 606, the process may return to act 602 where another measure of mass flow rate of the greenhouse gas is obtained. Alternatively, the process 600 may end. The process 600 may be initiated and repeated in response to a user command, in some embodiments. In some embodiments, the process may be initiated and repeated autonomously. For example, the process 600 may be performed at least once per month, at least one per week, at least once per day, at least once per hour, etc.

Figure 6B:
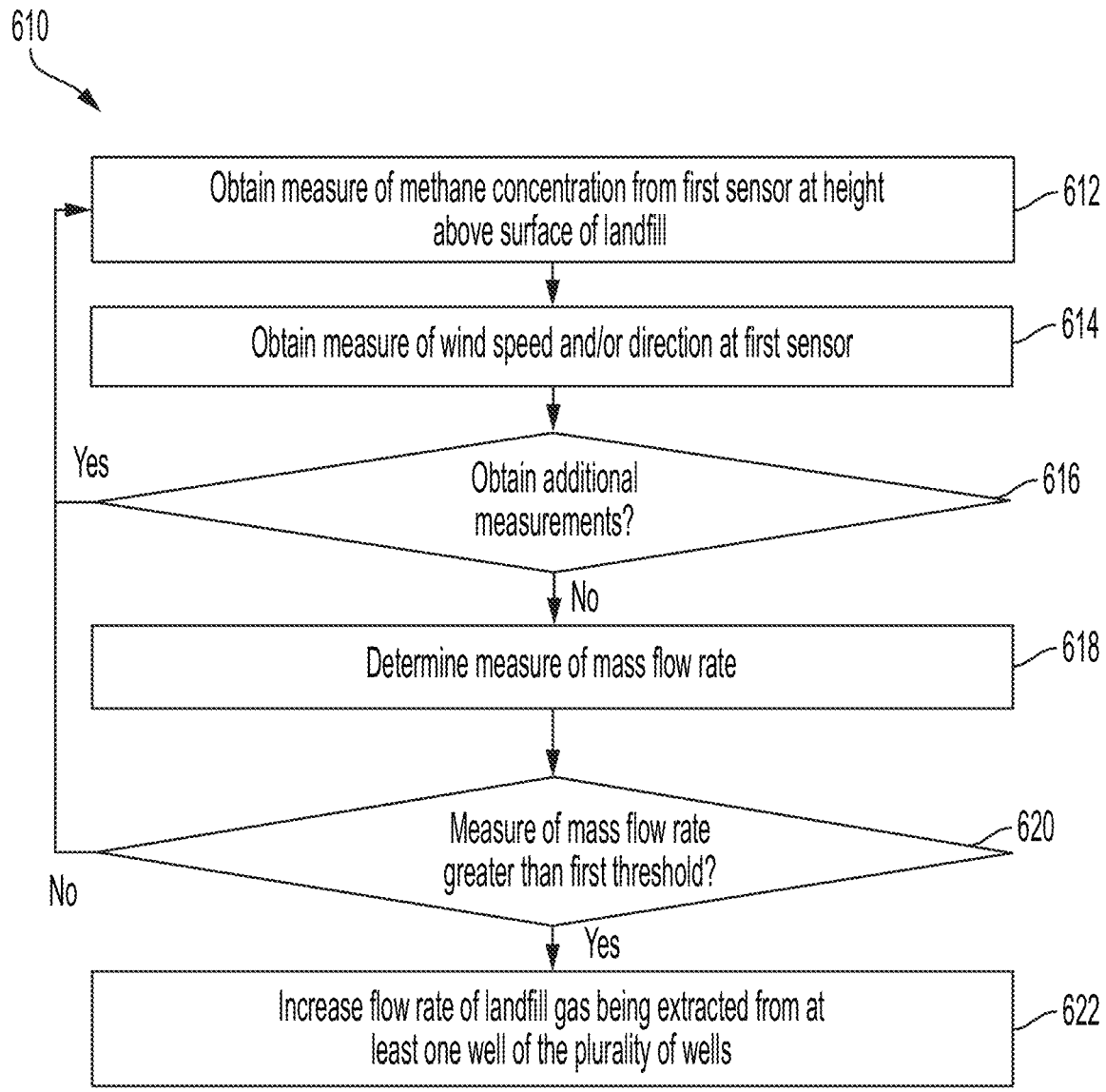
FIG. 6B is a flowchart of an illustrative process for emissions-based control of landfill gas extraction using a measure of mass flow rate, according to some embodiments.
Figure 6C:
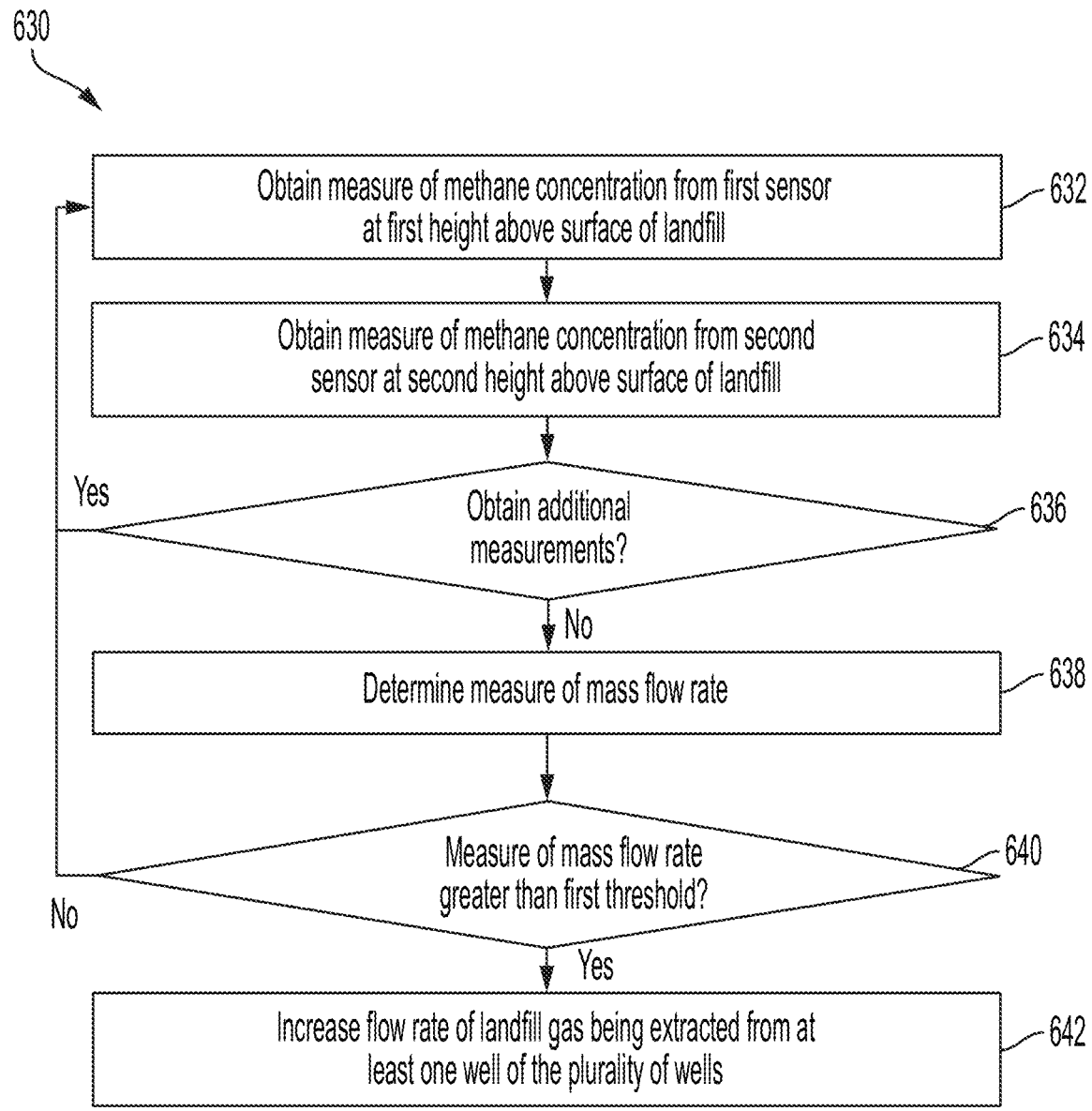
FIG. 6C is a flowchart of another illustrative process for emissions-based control of landfill gas extraction using a measure of mass flow rate, according to some embodiments.

FIGS. 6B-6C illustrate flowcharts of illustrative processes for emissions-based control of landfill gas extraction, according to some embodiments. In particular, FIGS. 6B-6C illustrate example processes for controlling landfill gas extraction based on multiple emissions measurements obtained by a plurality of emissions sensors disposed in the region of the landfill. The processes 610 and 630 shown in FIGS. 6B-6C may be performed using the sensor systems 524A, 524B shown in FIG. 5B, for example.

FIG. 6B is a flowchart of an illustrative process for emissions-based control of landfill gas extraction using a measure of mass flow rate across a landfill, according to some embodiments. Process 610 may begin at act 612, where a measure of methane concentration is obtained from a first sensor at a height above a surface of the landfill. For example, a first emissions sensor may be disposed above a surface of a region of the landfill. The first emissions sensor may be configured to obtain a concentration of methane from a sample of ambient air in the region of the landfill.

Although the example processes 610 and 630 are described herein with respect to methane, it should be understood that the processes 610 and 630 could be performed for other greenhouse gasses such as carbon dioxide, hydrogen sulfide, nitrogen and/or benzene.

At act 614, a measure of wind speed and/or wind direction may be obtained. For example, the measure of wind speed and/or direction may be obtained using one of wind sensors 524A, 524B described herein with respect to FIG. 5B. In some embodiments, only a measure of wind speed or wind direction is obtained at act 614. In other embodiments, a measure of both wind speed and direction is obtained.

At act 616, it may be determined whether to obtain additional measurements of methane concentration and wind speed and/or direction. For example, as described herein, a landfill may have multiple sensor systems (e.g., comprising an emissions sensor and a wind sensor) disposed at different locations in the region of the landfill. Each of the sensor systems may be disposed at a same height so that measurements obtained by each sensor system may be compared with each other. Acts 612-614 may be performed for a first sensor system of a plurality of sensor systems disposed in a region of a landfill and thereafter repeated for one or more of the remaining sensor systems disposed in the region of the landfill. Accordingly, if there are additional measurements to be obtained from the not yet sampled sensor systems, the process 610 may return through the yes branch to act 612. Otherwise, the process may proceed through the no branch to act 618, At act 618, a measure of mass flow rate of methane may be determined based on the measures of methane concentration and wind speed and/or direction obtained at acts 612-614. In instances where multiple measures of methane concentration and wind speed and/or direction were obtained at acts 612-614, the measure of mass flow rate may be considered to represent an aggregate mass flow rate from a region of the landfill comprising the sensor systems from which measurements were obtained.

For example for a fixed height (above the surface of the landfill) and known area (of the region of the landfill being measured, a measure of aggregate mass flow rate of a greenhouse gas for the region of the landfill may be determined based on measurements of gas concentration and wind speed and/or direction obtained at the fixed height. In particular, a measure of greenhouse gas concentration at a fixed distance above the surface may be multiplied by a wind speed taken at the fixed distance to obtain a measure of the flow rate of the greenhouse gas at the point the measurements were obtained. Factoring in the wind direction allows for determining the amount and direction of the greenhouse gas flow rate. With multiple measurements of gas concentration and wind speed and/or direction taken at different locations in the landfill, an average flow rate of the greenhouse gas for the landfill may be obtained by summing the flow rate vectors (where wind direction is considered) and dividing the total by the number of measurements pairs (concentration and wind characteristic) obtained. The aggregate mass flow rate may be obtained by factoring in the area over which the measurements were obtained (e.g., by dividing the measure of aggregate flow rate by the total area considered).

In some embodiments, one or more additional characteristics may be taken into account when determining the measure of mass flow rate at act 618. For example, in some embodiments, one or more measures of ambient air pressure, ambient air humidity, and/or ambient air temperature may be obtained and used to further refine the determination of the measure of mass flow rate at act 618.

At act 620, it is determined whether the measure of mass flow rate is greater than a first threshold. For example, act 620 may be performed in the same manner as act 604 described herein with respect to process 600. If it is determined, at act 620, that the measure of mass flow rate is not greater than the first threshold, the process 610 may proceed through the no branch to act 612, where additional measurements of methane concentration are obtained. If it is determined, at act 620, that the measure of mass flow rate is greater than the first threshold, the process 610 may proceed through the yes branch to act 622.

At act 622, a flow rate of landfill gas being extracted from at least one gas extraction well of a plurality of gas extraction wells in the region of the landfill may be increased. For example, act 620 may be performed in the same manner as act 606 described herein with respect to process 600.

FIG. 6C is a flowchart of another illustrative process for emissions-based control of landfill gas extraction using a measure of mass flow rate across a landfill, according to some embodiments. Process 630 may begin at act 632, where a measure of methane concentration in ambient air is obtained from a first sensor at a first height above a surface of the landfill. For example, a first emissions sensor may be disposed above a surface of a region of the landfill. The first emissions sensor may be configured to obtain a concentration of methane from a sample of ambient air in the region of the landfill.

At act 634, a measure of methane concentration in ambient air is obtained from a second sensor at a second height above a surface of the landfill. The second height may be greater than the first height. Accordingly, acts 632-634 provide methane concentration measurements at two different heights above the surface of the landfill. The inventors have recognized that in cases where no wind is present, a measure of wind speed and/or direction may not be helpful in determining a measure of mass flow rate of a greenhouse gas present in ambient air above a surface of the landfill. Instead of measuring a characteristic of wind which may not be present, the dissipation of the greenhouse gas may be determined by measuring the concentration of the greenhouse gas at two different heights above the surface of the landfill.

At act 636, it may be determined whether to obtain additional measurements of methane concentration from the first and second sensors. For example, as described herein, a landfill may have multiple sensor systems (e.g., multiple sets of sensor systems having emissions sensors at first and second heights) disposed at different locations in the region of the landfill. Acts 632-634 may be performed for a first set of sensor systems of a plurality of sets of sensor systems disposed in a region of a landfill and thereafter repeated for one or more of the remaining sets of sensor systems disposed in the region of the landfill. Accordingly, if there are additional measurements to be obtained from the not yet sampled sensor systems, the process 630 may return through the yes branch to act 632. Otherwise, the process may proceed through the no branch to act 638, At act 638, a measure of mass flow rate of methane may be determined based on the measures of methane concentration obtained at acts 632-634 from the first and second sensors. In instances where multiple sets of measures of methane concentration were obtained at acts 632-634, the measure of mass flow rate may be considered to represent an aggregate mass flow rate from a region of the landfill comprising the sensor systems from which measurements were obtained.

The measure of mass flow rate of the greenhouse gas may be determined as described herein with respect to act 618 in process 610, except wind speed and/or direction may not be taken into account. Instead, dissipation of the greenhouse gas in the atmosphere may be approximated by obtaining the measurements of greenhouse gas concentration at two different heights above a point on the landfill surface and considering the difference between the two measurements. The approximated dissipation may than be used in place of wind speed in determining a mass flow rate of the greenhouse gas.

In some embodiments, one or more additional characteristics may be taken into account when determining the measure of mass flow rate at act 638. For example, in some embodiments, one or more measures of ambient air pressure, ambient air humidity, and/or ambient air temperature may be obtained and used to further refine the determination of the measure of mass flow rate at act 638.

At act 640, it is determined whether the measure of mass flow rate is greater than a first threshold. For example, act 640 may be performed in the same manner as act 604 described herein with respect to process 600. If it is determined, at act 640, that the measure of mass flow rate is not greater than the first threshold, the process 630 may proceed through the no branch to act 632, where additional measurements of methane concentration are obtained. If it is determined, at act 640, that the measure of mass flow rate is greater than the first threshold, the process 630 may proceed through the yes branch to act 642.

At act 642, a flow rate of landfill gas being extracted from at least one gas extraction well of a plurality of gas extraction wells in the region of the landfill may be increased. For example, act 642 may be performed in the same manner as act 606 described herein with respect to process 600.

Although processes 610 and 630 are based herein on mass flow rates, in some embodiments, the processes 610 and 630 may be performed based on emissions gas concentrations alone (e.g., an aggregate concentration of methane, carbon dioxide, hydrogen sulfide, nitrogen, and/or benzene). Further aspects of a process for controlling landfill gas extraction based on emissions gas concentration measurements are described herein, for example, with respect to process 700 shown in FIG. 7.

Figure 7:
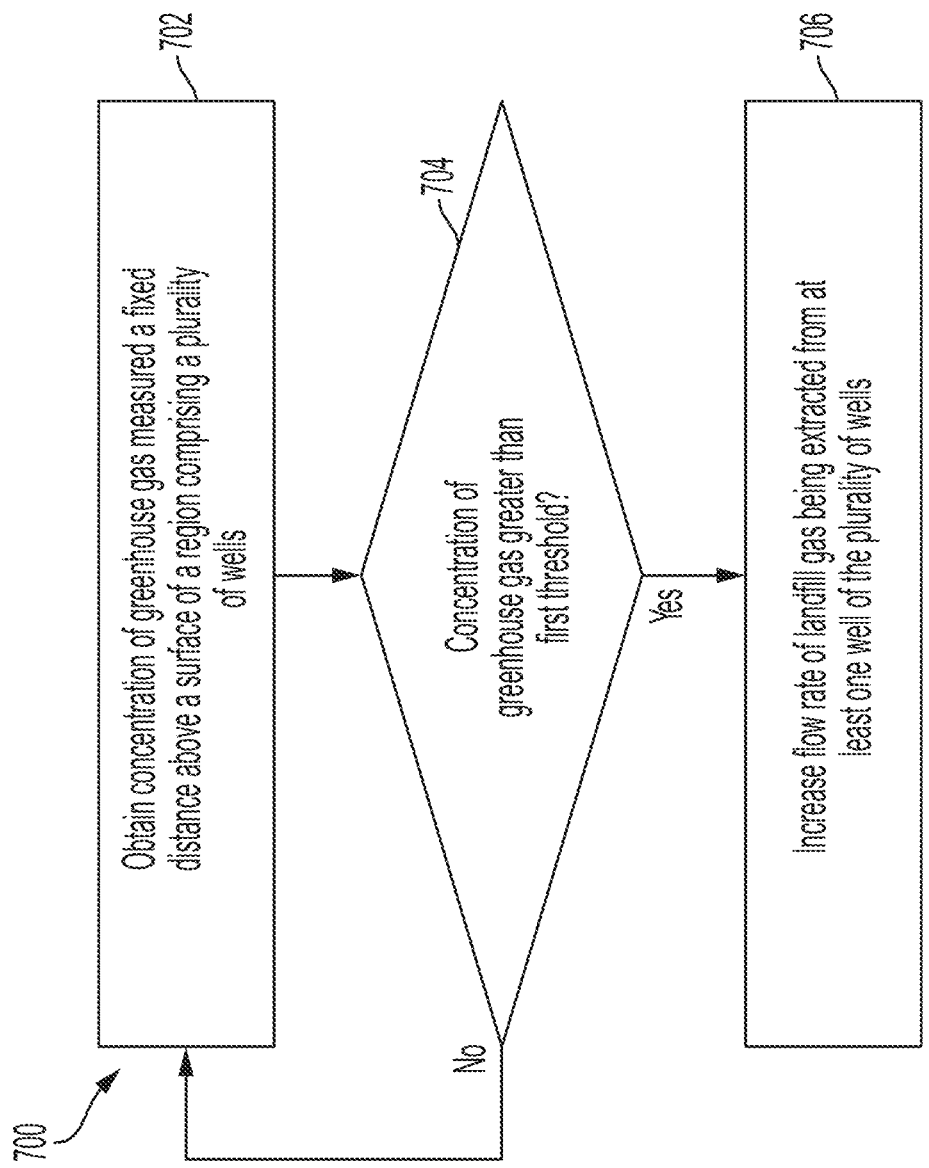
FIG. 7 is a flowchart of another illustrative process for emissions-based control of landfill gas extraction, according to some embodiments.

FIG. 7 is a flowchart of another illustrative process for emissions-based control of landfill gas extraction, according to some embodiments. Process 700 uses a concentration of a greenhouse gas measured a fixed distance about a surface of the landfill to control a flow rate of at least one well in the landfill.

Process 700 begins at act 702 where a measure of a concentration of a greenhouse gas being emitted from the landfill measured a fixed distance above the surface of the landfill is obtained. The measure of greenhouse gas concentration may be obtained by one or more emissions sensors, for example, emissions sensor 522 described herein. The greenhouse gas may comprise any greenhouse gas desired to be monitored, for example, methane, carbon dioxide, nitrogen, hydrogen sulfide, any other gas present in the emitted landfill gas and/or a combination thereof.

As described herein, the measure of greenhouse gas concentration may be obtained at a fixed distance above a surface of the landfill using the one or more emissions sensors. In some embodiments, the measure of greenhouse gas concentration is obtained for a region comprising a plurality of wells. In some embodiments, the plurality of wells comprises a portion of wells in the landfill (e.g., 20%, 50% of wells, etc.). In other embodiments, the plurality of wells includes all of the gas extraction wells disposed in the landfill. In some embodiments, the measure of greenhouse gas concentration is obtained for a region comprising only a single well.

At act 704, the measure of greenhouse gas concentration obtained at act 702 is compared to a first threshold to determine whether the measure of greenhouse gas concentration is greater than the first threshold. As described herein, the inventors have appreciated that it may be desirable to limit the concentration of greenhouse gasses present in the atmosphere at a fixed distance above the surface of the landfill. Thus, the process 700 may include determining whether a concentration of a particular greenhouse gas exceeds a threshold at a particular distance above the landfill surface.

In some embodiments, where the greenhouse gas comprises methane, the first threshold comprises 0 ppm methane, 10 ppm methane, 100 ppm methane, 200 ppm methane, 300 ppm methane, 400 ppm methane, 500 ppm methane, 900 ppm, 1000 ppm methane or any other suitable threshold. In some embodiments, where the greenhouse gas comprises carbon dioxide, the first threshold comprises 0 ppm carbon dioxide, 10 ppm carbon dioxide, 100 ppm carbon dioxide, 200 ppm carbon dioxide, 300 ppm carbon dioxide, 400 ppm carbon dioxide, 500 ppm, 1000 ppm carbon dioxide or any other suitable threshold In some embodiments, where the greenhouse gas comprises nitrogen, the first threshold comprises 0 ppm nitrogen, 10 ppm nitrogen, 100 ppm nitrogen, 200 ppm nitrogen, 300 ppm nitrogen, 400 ppm nitrogen, 500 ppm nitrogen or any other suitable threshold. In some embodiments, where the greenhouse gas comprises hydrogen sulfide, the first threshold comprises 0 ppm hydrogen sulfide, 10 ppm hydrogen sulfide, 100 ppm hydrogen sulfide, 200 ppm hydrogen sulfide, 300 ppm hydrogen sulfide, 400 ppm hydrogen sulfide, 500 ppm hydrogen sulfide or any other suitable threshold. In some embodiments, where the greenhouse gas comprises a combination of constituent gases present in landfill gas (e.g., methane, carbon dioxide, nitrogen, and/or hydrogen sulfide), the first threshold comprises 0 ppm combined gas, 10 ppm combined gas, 100 ppm combined gas, 200 ppm combined gas, 300 ppm combined gas, 400 ppm combined gas, 500 ppm combined gas or any other suitable threshold. In some embodiments, the first threshold comprises a range, for example, between 0 and 500 ppm, between 0 and 1000 ppm, between 10 and 100 ppm, etc.

If, at act 704, it is determined that the measure of greenhouse gas concentration obtained at act 702 is not greater than (e.g., less than, less than or equal to) the first threshold, no changes may be made to the flow rate of landfill gas being extracted from the plurality of wells (e.g., a position of a valve of the at least one well may be maintained). The process 700 may return through the no branch to act 702 where another measure of greenhouse gas concentration is obtained. Alternatively, the process 700 may end.

If, at act 704, it is determined that the measure of greenhouse gas concentration obtained at act 702 is greater than the first threshold, the process 700 may proceed through the yes branch to act 706. At act 706, a flow rate of landfill gas being extracted from at least one well of the plurality of wells may be increased. As described herein, increasing the flow rate of landfill gas being extracted from the at least one gas extraction well equilibrates the rate of landfill gas extraction and the rate of landfill gas production to prevent excess landfill gas from accumulating and penetrating the surface of the landfill.

In some embodiments, increasing a flow rate of landfill gas being extracted from the at least one well comprises increasing a degree to which a valve of the at least one well is open. In some embodiments, the flow rate of landfill gas extraction may additionally or alternatively be adjusted by increasing or decreasing a vacuum applied by the control system. As described herein, in some embodiments, an error check may be performed prior to increasing the flow rate of landfill gas extraction from the at least one well to ensure that increasing the flow rate will not have a negative impact on the landfill gas quality and/or the gas extraction system.

In some embodiments, act 706 comprises adjusting the flow rate of a single well. In some embodiments, act 706 comprises adjusting the flow rate of multiple wells (e.g., a portion of or all of the wells in the region from which the emissions measurement was obtained, a portion or all of the wells in the landfill). Techniques for selecting which wells to adjust in response to determining that the measure of greenhouse gas concentration obtained at act 704 is greater than the first threshold are further described herein.

Subsequent to act 706, the process may return to act 702 where another measure of greenhouse gas concentration is obtained. Alternatively, the process 700 may end. The process 700 may be initiated and repeated in response to a user command, in some embodiments. In some embodiments, the process may be initiated and repeated autonomously. For example, the process 700 may be performed at least once per month, at least one per week, at least once per day, at least once per hour, etc.

c. Well Selection

As described herein, the emissions-based control methods include increasing a flow rate of landfill gas being extracted form at least one well of a plurality of wells in response to determining that an emissions characteristic exceeds a threshold. Techniques for determining which wells of the plurality of wells to adjust are further described herein.

In some embodiments, increasing the flow rate of at least one well comprises increasing the flow rate of all wells in the region from which the emissions characteristic measurement is obtained. In some embodiments, flow rates of gas extraction wells in a buffer region may also be increased. The buffer region may be external to the region from which the emissions characteristic is obtained. In some embodiments, the buffer region comprises an area surrounding the region from which the emissions characteristic measurement is obtained. The size of the buffer region may be described as a percentage of the area of the region from which the emissions characteristic measurement is obtained. For example, in some embodiments, the buffer region has a size that is 10%, 20%, 25%, 30%, 40%, 50%, etc., the size of the region from which the emissions characteristic measurement is obtained.

In some embodiments, the at least one well is selected based on one or more characteristics of the landfill gas extraction well and/or the landfill gas being extracted via the gas extraction well. For example, in some embodiments, selecting which wells of the plurality of wells to adjust is based on a composition of the landfill gas being extracted from the plurality of wells.

Figure 8A:
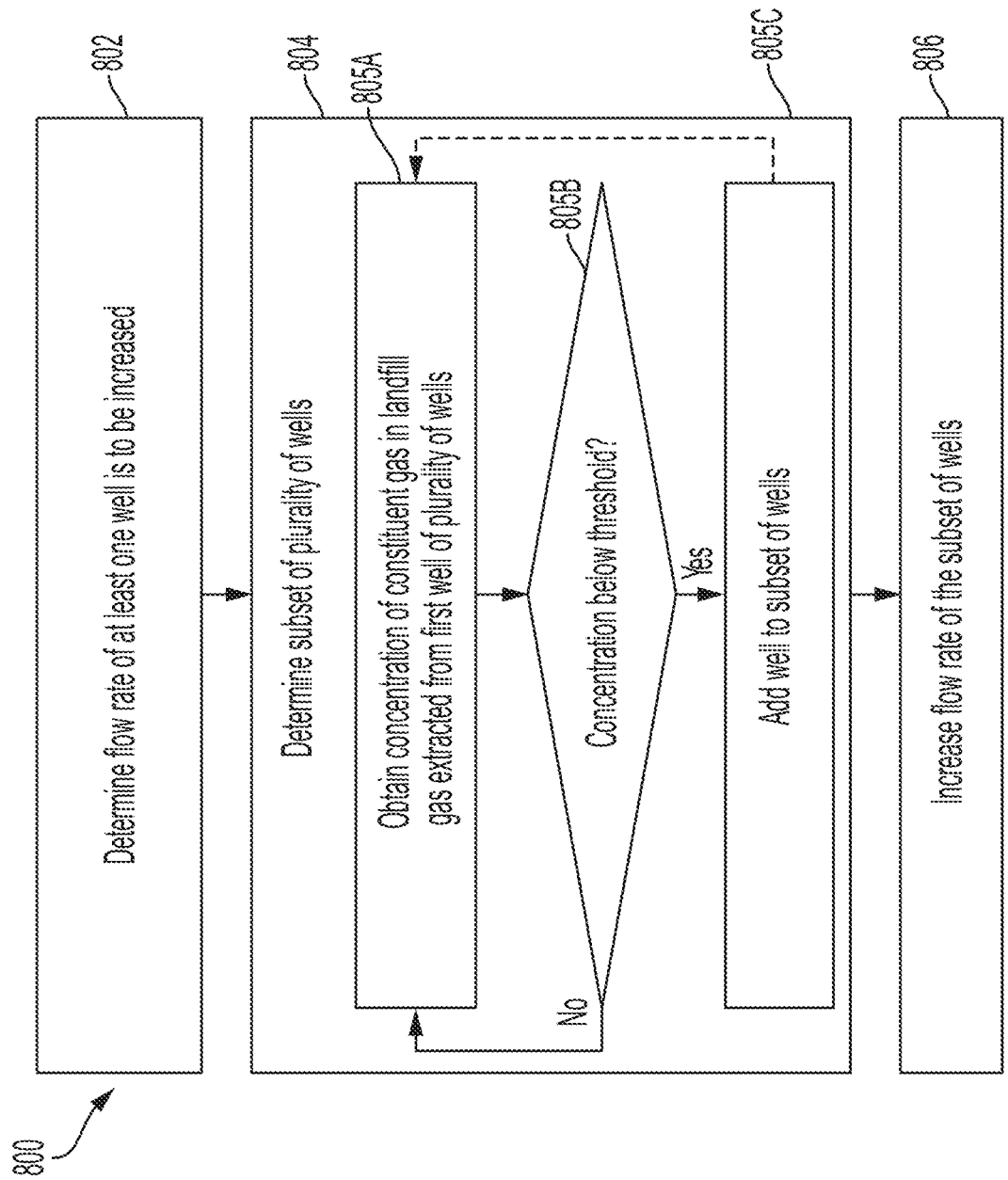
FIGS. 8A-8B are flowcharts of example processes for selecting one or more wells to adjust during emissions-based control of landfill gas extraction, according to some embodiments.
Figure 8B:
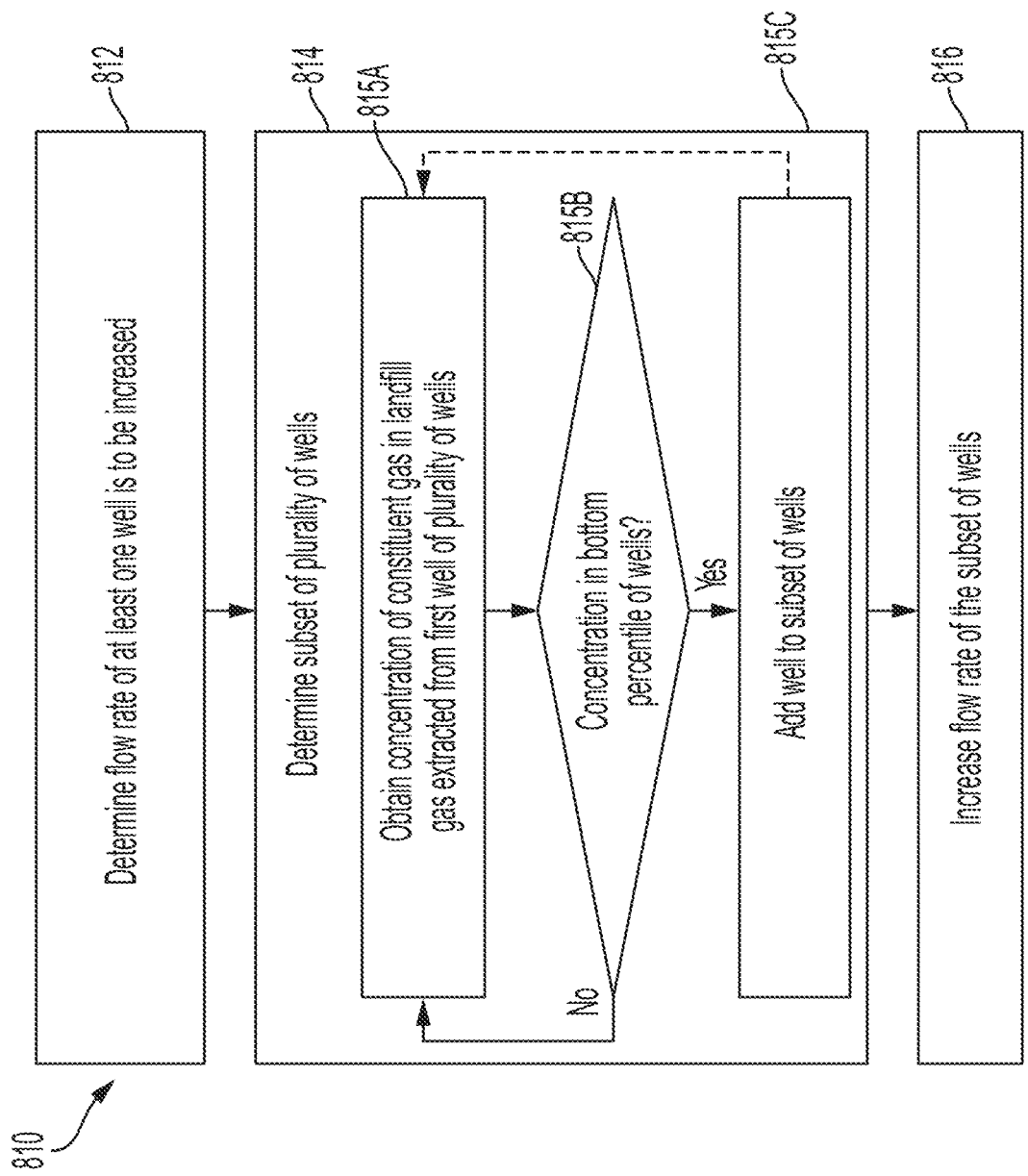

FIGS. 8A-8B are flowcharts of example processes for selecting one or more wells to adjust during emissions-based control of landfill gas extraction, according to some embodiments. In particular, FIG. 8A illustrates a process 800 for selecting one or more wells to increase landfill gas extraction flow rates of which is based on whether a concentration of a constituent gas in the landfill gas being extracted from the plurality of wells is above or below a threshold.

Process 800 begins at act 802, where it is determined that a flow rate of at least one well of a plurality of wells is to be increased, for example, at act 606 and/or act 706 of processes 600 and 700. At act 804, a subset of wells to increase gas extraction flow rates of is selected. Act 804 of process 800 illustrates an example implementation for determining which wells to include in the subset of wells.

At act 804, wells which have a concentration of a constituent gas that is above an upper threshold (e.g., for methane, carbon dioxide, etc.) or below a lower threshold (e.g., for oxygen, balance gas, etc.) are selected. In particular, at act 805A, a concentration of a constituent gas in landfill gas being extracted from a first well of the plurality of wells is obtained. The constituent gas may be, for example, oxygen, balance gas, methane carbon dioxide, or any constituent gas in the landfill gas being extracted from the landfill.

At act 805B, the constituent gas concentration is compared to a threshold. In the illustrated embodiment, at act 805B, the constituent gas concentration is compared to an upper threshold to determine whether the constituent gas concentration is less than the upper threshold. Such a comparison may be performed where the constituent gas comprises oxygen and/or balance gas, for example. The inventors have appreciated that it is undesirable to increase flow rates of gas extraction wells extracting landfill gas with high oxygen or balance gas concentrations, as increasing the flow rate for such wells may cause more oxygen to be pulled into the landfill from above the surface of the landfill. Doing so may deteriorate the quality of the extracted landfill gas by reducing the concentration of methane in the extracted landfill gas (due to oxygen's ability to impair or destroy conditions necessary for the production of methane) and may potentially result in underground fires. Thus, only wells extracting landfill gas having oxygen and/or balance gas concentrations below an upper threshold may be selected for adjustment.

Although not shown in the illustrated embodiment, act 805B may additionally or alternatively comprise comparing the concentration of the constituent gas obtained at act 805A to an upper threshold, to determine whether the concentration of the constituent gas is greater than the upper threshold. For example, it may be desirable to increase the flow rate of wells extracting landfill gas having methane and/or carbon dioxide concentrations which are among the highest for the plurality of wells as the wells having the highest methane and/or carbon dioxide content are most likely to produce leaks of greenhouse gas into the atmosphere. Thus, at act 805B, it may be determined whether the concentration of methane and/or carbon dioxide of the landfill gas being extracted from the first well is above an upper threshold.

If, at act 805B, the concentration of the constituent gas obtained at act 805A is not below the lower threshold and/or above the upper threshold, the process may return through the no branch to act 805A where a concentration of the constituent gas for a second well is obtained. Alternatively, the process 800 may end. If, at act 805B, the concentration of the constituent gas obtained at act 805A is below the lower threshold and/or above the upper threshold, the process may proceed through the yes branch to act 805C where the first well is added to the subset of wells. Act 804 may be repeated until all wells of the plurality of wells are considered.

Once the subset of wells is determined at act 804, flow rates of landfill gas being extracted from the subset of wells may be increased at act 806. Process 800 shown in FIG. 8 is therefore a threshold-based approach. Accordingly, in some embodiments, all wells of the plurality of wells may be added to the subset of wells for which flow rate is increased. In some embodiments, only a portion of the plurality of wells are added to the subset of wells for which flow rate is increased. In some embodiments, no wells are added to the subset of wells for which flow rate is increased. In such embodiments, an alert may be transmitted to an operator to indicate that it is not possible to autonomously increase a flow rate of at least one well, and further input is required.

FIG. 8B illustrates another example process 810 for selecting one or more wells to increase landfill gas extraction flow rates of. The approach shown in process 810 selects a portion of wells of the plurality having the "best" or "worst" concentrations of a constituent gas to adjust a flow rate of.

Process 810 begins at act 812 where it is determined that a flow rate of at least one well of a plurality of wells is to be increased, for example, at act 606 and/or act 706 of processes 600 and 700. At act 814, a subset of wells to increase gas extraction flow rates of is selected. Act 814 of process 810 illustrates another example implementation for determining which wells to include in the subset of wells.

At act 814, a percentage of wells which have a concentration of a constituent gas that is in the bottom percentile (e.g., for methane, carbon dioxide, etc.) or the top percentile (e.g., for oxygen, balance gas, etc.) of the plurality of wells are selected. In particular, at act 815A, a concentration of a constituent gas in landfill gas being extracted from a first well of the plurality of wells is obtained. The constituent gas may be, for example, oxygen, balance gas, methane carbon dioxide, or any constituent gas in the landfill gas being extracted from the landfill.

At act 815B, it is determined whether the concentration of the constituent gas for the first well is in the bottom or top percentile of wells. In the illustrated embodiment, at act 815B, the constituent gas concentration is analyzed to determine whether the constituent gas concentration is in a bottom percentile among the plurality of wells (e.g., the bottom 50% of concentrations among the plurality of wells, the bottom 20% of concentrations among the plurality of wells). Such a comparison to the bottom percentile of concentrations may be performed where the constituent gas comprises oxygen and/or balance gas, for example. As described herein, the inventors have appreciated that it is undesirable to increase flow rates of gas extraction wells extracting landfill gas with high oxygen or balance gas concentrations, thus, only wells extracting landfill gas having oxygen and/or balance gas concentrations in a bottom percentile of concentrations may be selected for adjustment.

Although not shown in the illustrated embodiment, act 815B may additionally or alternatively comprise analyzing the concentration of the constituent gas obtained at act 815A to determine whether the concentration of the constituent gas is among an upper percentile of concentrations (e.g., the top 50% of concentrations among the plurality of wells, among the top 20% of concentrations among the plurality of wells). As described herein, it may be desirable to increase the flow rate of wells extracting landfill gas having methane and/or carbon dioxide concentrations which are among the highest for the plurality of wells.

If, at act 815B, the concentration of the constituent gas obtained at act 815A is not among the bottom or top percentiles of wells, the process may return through the no branch to act 815A where a concentration of the constituent gas for a second well is obtained. Alternatively, the process 810 may end. If, at act 815B, the concentration of the constituent gas obtained at act 805A is among the bottom or top percentiles of wells, the process may proceed through the yes branch to act 815C where the first well is added to the subset of wells. Act 814 may be repeated until all wells of the plurality of wells are considered.

Once the subset of wells is determined at act 814, flow rates of landfill gas being extracted from the subset of wells may be increased at act 816. Process 810 shown in FIG. 8 is therefore a percentile-based approach. Accordingly, a flow rate of at least one well of the plurality of wells is adjusted according to process 810 while a flow rate of at least one other well of the plurality of wells is unchanged.

Although the processes illustrated in FIGS. 8A-8B are described with respect to constituent gas concentrations, it should be appreciated that other characteristics of a gas extraction well and/or extracted landfill gas may be used to select which wells of the plurality of wells to adjust. For example, in some embodiments, landfill gas extraction wells having the lowest upstream pressure are selected (e.g., having an upstream pressure less than a threshold and/or among the bottom percentile of measured upstream pressures for the plurality of wells). In some embodiments, landfill gas extraction wells having the lowest flow rate are selected (e.g., having a flow rate less than a threshold and/or among the bottom percentile of flow rates for the plurality of wells). In some embodiments, landfill gas extraction wells having the lowest valve position (e.g., opened to the least degree) are selected (e.g., having a valve position less than a threshold and/or among the bottom percentile of valve positions for the plurality of wells).

d. Flow Rate Adjustment Selection

As described herein, the emissions-based control methods include increasing a flow rate of landfill gas being extracted form at least one well of a plurality of wells in response to determining that an emissions characteristic exceeds a threshold. In some embodiments, the adjustment made to the flow rate of the at least one well is a default adjustment which is independent of the well to which the adjustment is applied and/or the emissions characteristic measurement. In some embodiments, adjustments applied to the flow rate of the plurality of wells may be configurable by a user via a user interface, as described herein.

In some embodiments, the adjustment made to the flow rate of the at least one well is dependent on characteristics of the at one well, characteristics of landfill gas being extracted from the at least one well, and/or the emissions characteristic measurement. For example, increasing the flow rate of landfill gas being extracted from the at least one well may comprise (1) determining a scaling factor by which to proportionally adjust a degree to which a valve of the first well is opened or closed; and (2) adjusting the flow rate of the landfill gas being extracted from the first well according to the scaling factor.

In some embodiments, the adjustment applied to the at least one well varies depending on the well to which the adjustment is applied. For example, different wells may react differently to various changes. The flow rate adjustment may be tuned based on unique characteristics of the well. For example, a constituent gas concentration (such as methane concentration, for example) in landfill gas being extracted from a first well may be more sensitive to changes in flow rate than landfill gas being extracted from a second well. In particular, the constituent gas concentration may increase or decrease by a larger amount in response to a change in flow rate as compared to a constituent gas concentration of landfill gas at other wells. In some embodiments, the sensitivity of the landfill gas composition to a change in flow rate for a particular well may be based, at least in part, on the ground cover in a region of the well (e.g., a depth of the ground cover, a density of the ground cover).

In some embodiments, characteristics such as the current valve position and/or applied upstream and/or downstream pressure in the well piping vary from well to well. A scaling factor applied to the flow rate adjustment made to a well may be based at least in part on such characteristics. For example, where a well characteristic is closer to a target value a small adjustment to the flow rate may be made while when a well characteristic is further from a target value, a larger adjustment to the flow rate may be made.

In some embodiments, the adjustment applied to the at least one well varies depending on the emissions characteristic measurement. In some embodiments, a scaling factor applied to the flow rate adjustment made to a well may be based at least in part on a difference between the emissions characteristic measurement (e.g., mass flow rate of a greenhouse gas, concentration of a greenhouse gas measured a fixed distance above the surface of the landfill) and a target value.

In some embodiments, the adjustment applied to the at least one well varies depending on characteristics of the landfill gas being extracted from the at least one well. For example, a scaling factor applied to the flow rate adjustment may be based at least in part on a difference between a landfill gas characteristic (e.g., a constituent gas concentration) and a target value.

e. User Interface and Reporting

The control system for performing emissions-based landfill gas extraction may be configured to report and/or store information regarding aspects of the landfill gas extraction techniques. For example, in some embodiments, the emissions-based techniques described herein further comprise storing information (e.g., emissions characteristic measurements, landfill gas characteristic measurements, valve adjustments performed) in a local and/or remote storage of a remote system. In some embodiments, the remote system further comprises a processor for processing the information stored in the remote storage. For example, in some embodiments, some or all aspects of the emissions-based techniques described herein are performed by a processor of the remote system.

In some embodiments, the emissions-based techniques further comprise reporting information to one or more users. For example, information (e.g., emissions characteristic measurements, landfill gas characteristic measurements, valve adjustments performed) may be reported to one or more users. In some embodiments, an alert (such as a text message, phone call, email, push notification, alarm and/or other alert) may be transmitted to one or more users. In some embodiments, the alert may be generated when a landfill gas leak or other problematic condition is present at the landfill. In some embodiments, an additional alert may be transmitted when an emissions characteristic measurement remains above a threshold after corrective action to address the exceedance is taken.

In some embodiments, the control system for performing emissions-based landfill gas extraction techniques further comprises a user interface. The user interface may be configured to display information related to the emissions-based landfill gas extraction techniques (e.g., emissions characteristic measurements, landfill gas characteristic measurements, valve adjustments performed). In some embodiments, the user interface is configured to receive an input from a user. For example, the user interface may allow a user to customize one or more aspects of the landfill gas extraction techniques (e.g., setting thresholds, setting alarms, setting valve adjustment values, selecting an emissions-based technique to perform, selecting a region to apply an emissions-based technique, selecting a sampling frequency, etc.). In some embodiments, the user interface displays a digital map of the landfill displaying the plurality of wells. The digital map may provide a visual indication of conditions associated with the plurality of wells, including whether a leak has occurred.

IV. Variable System Vacuum

As described herein, increasing a flow rate of at least one well of the plurality of wells according to the emissions-based landfill gas extraction techniques described herein may comprise increasing a degree to which a valve of the at least one well is open and/or increasing a vacuum applied to the plurality of wells by a system vacuum. In some embodiments, determining how to increase the flow rate of the landfill gas being extracted from the plurality of wells is based on a percentage of the landfill surface for which the emissions characteristic exceeds a threshold. For example, when the emissions characteristic exceeds a threshold across an area equal to 33% or more, 50% or more, etc., of the landfill surface area, the flow rate of the at least one well may be increased by increasing the vacuum applied to the plurality of wells. If, instead, the emissions characteristic exceeds a threshold across an area that is equal to less than 50% of the landfill surface area, the flow rate of the at least one well may be increased by adjusting a degree to which a valve of the at least one well is open.

In some embodiments, adjusting the flow rate by increasing the vacuum applied to the plurality of wells may be performed only once in a particular time period. The inventors have recognized that adjustments to the applied vacuum may result in changes in landfill gas composition and/or landfill gas emissions that vary by each gas extraction well based on a distance between the system vacuum 520 and the individual well. In addition, adjustment to the applied vacuum may take effect over a period of time and may not occur instantaneously. In some embodiments, the control system 500 may wait at least 8 hours before making an additional adjustment to the applied vacuum.

V. Liquid Level Control

According to some aspects of the technology described herein, techniques for controlling a level of liquid present in a landfill gas extraction well are provided. The liquid level control techniques described herein may be performed in combination with the techniques for emission based landfill gas extraction control, in some embodiments.

The inventors have appreciated that high liquid levels in gas extraction wells may lead to dangerous conditions and/or equipment damage if the liquid levels are not controlled. For example, with reference to FIG. 9A, liquids may accumulate in a gas extraction well 904 disposed in a landfill 902 due to rain, organic decomposition, and other sources. High liquid levels cause liquid 910 and landfill gas to compete for space within the gas extraction well 904. The high liquid levels may also block openings formed in perforated portions 906 of the gas extraction well 904, thereby preventing landfill gas from entering the gas extraction well 904. As such, excess liquid levels may reduce gas collection rates and may also increase gas pressure within the gas extraction well 904 causing leachate steeps, blowouts, and/or silt formation in wells. Thus, the inventors have developed techniques for reducing liquid levels in gas extraction wells to prevent such conditions from occurring.

The inventors have further appreciated that sampling landfill gas when the level of liquid in a gas extraction well 904 is too high may cause liquid to be drawn up through the well piping. Sensors in a gas composition chamber for sampling the extracted landfill gas may be risk of being exposed to the extracted liquid as well. Exposing gas composition sensors to liquid may damage the sensors in addition to distorting the accuracy of the sensor measurements. Decreasing the pressure in the well piping where excess liquid has accumulated by increasing a degree to which a valve of the gas extraction well 904 is opened and/or increasing a system vacuum applied to the gas extraction well 904 may be hazardous as doing so may cause additional liquid to be pulled into the gas extraction well 904, raising liquid levels further. Thus, the inventors have developed techniques for preventing gas sampling and/or an increase in gas extraction flow rate when liquid levels in gas extraction wells exceed a threshold. The liquid level control techniques described herein may be implanted autonomously, without the need for manual intervention.

As shown in FIG. 9A, a liquid level control system 900 may comprise a liquid level sensor 908 may be disposed in the gas extraction well 904 for measuring a level of liquid 910 in the gas extraction well. The liquid level sensor 908 may be any suitable sensor, such as a pressure sensor, a float, an optical sensor (e.g., infrared, laser), etc. In some embodiments, the liquid level sensor 908 is configured to determine whether a level of liquid 910 in the gas extraction well 904 has exceeded a threshold (e.g., a threshold height of the landfill gas extraction well 904, a threshold volume of liquid present in the gas extraction well 904). In some embodiments, the liquid level sensor 908 is configured to obtain a measurement of the liquid level present in the gas extraction well (e.g., a height of the liquid, a volume of the liquid). In some embodiments, a controller 916 may determine whether the measurement of the liquid level obtained by the liquid level sensor 908 exceeds a threshold.

Figure 9B:
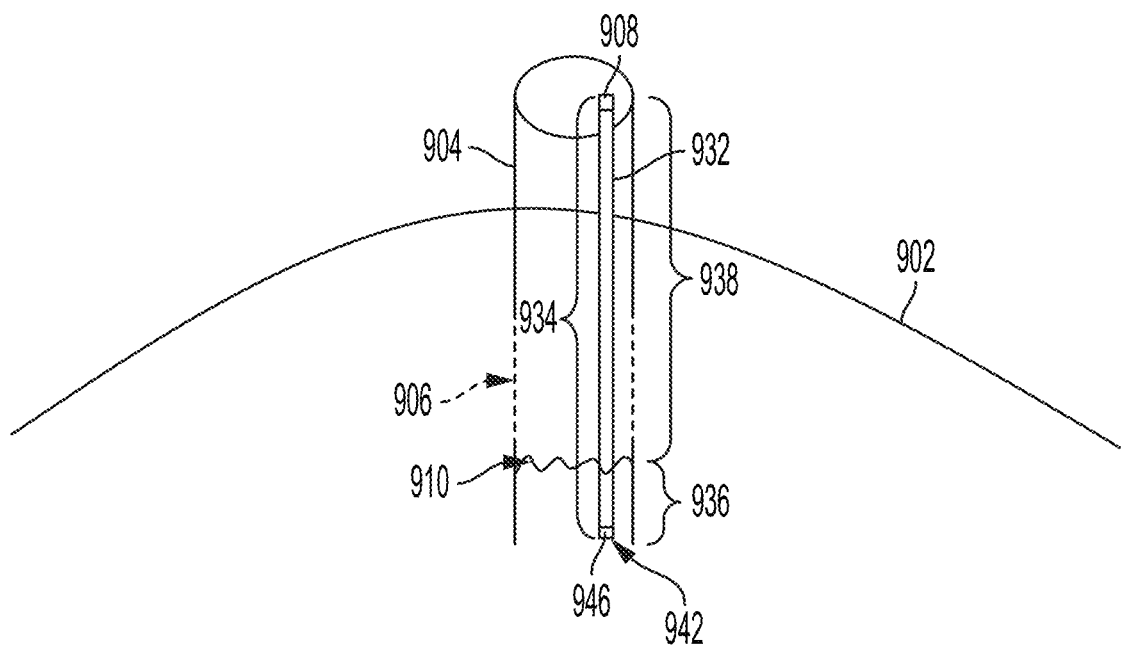
FIG. 9B illustrates another example system for monitoring a liquid level of a gas extraction well, according to some embodiments.

FIG. 9B illustrates another example system for monitoring a liquid level of a gas extraction well, according to some embodiments. In the illustrated embodiment of FIG. 9B, tubing 932 of known length is inserted into the gas extraction well 904. The tubing 932 comprises an opening 942 at an end of the tubing 932 inserted into the gas extraction well 904 to allow liquid 910 to enter tubing 932. The end of tubing 932 comprising the opening 942 may further comprise probe 946. Probe 946 may weight the tubing 932 to ensure proper insertion and positioning within the gas extraction well 904.

The height of the liquid 910 in the tubing is shown in FIG. 9B as liquid height 936. The height of the liquid 910 in the tubing 932 may be used, together with the known length 934 of the tubing 932 to determine a difference between the height of the liquid 910 in the gas extraction well and the height of the top of the gas extraction well 904, shown in FIG. 9B as height to surface 938. That is, the height to surface 938 may be defined as the height from the liquid 910 to the top of the gas extraction well 904.

In some embodiments, the width of the tubing 932 is ¼ of an inch. In some embodiments, the tubing length may be at least 100 feet, at least 150 feet, at least 200 feet. In some embodiments, the tubing length may be less than or equal to 200 feet. The embodiments illustrated herein may measure liquid heights up to 15 inches, up to 20 inches, up to 25 inches, or up to 30 inches, in some embodiments.

In some embodiments, the liquid height 936 of liquid 910 in tubing 932 may be determined using liquid level sensor 908. In some embodiments, liquid level sensor 908 may be disposed outside of gas extraction well 904. In the illustrated embodiment of FIG. 9B, the liquid level sensor 908 comprises a pressure sensor for measuring air pressure within the tubing 932. The pressure sensor may be of any suitable type, for example, the pressure sensor may comprise an electronic sensor and/or a gauge pressure sensor. Tubing 932 may be a closed system. That is, tubing 932 may be open on one end (with opening 942) to allow liquid 910 to enter the tubing 932, but closed to the atmosphere on the opposite end of the tubing 932. As liquid 910 enters the tubing 932 via opening 942, air within the tubing 932 is compressed. In turn, the compression of air increases the pressure within the tubing 932, which is sensed by liquid level sensor 908.

The measure of pressure in tubing 932, measured by liquid level sensor 908, may be used to determine the liquid height 936. For example, where the measurement of pressure obtained by the liquid level sensor is given in PSI, the liquid height 936 may be determined, in feet, by the following equation:

$$\text{Liquid Height} = \text{Pressure} * 2.31 \text{ ft/PSI}$$

In some embodiments, where the measurement of pressure is given in inches of water, the liquid height, in inches, is equal to the measurement of pressure. The height to surface 938, that is the height to the top of the gas extraction well from the liquid level, may be obtained by subtracting the liquid height 936 from the tubing length 934.

As described herein, the measure of liquid level in the at least one well may be used to determine whether the liquid level greater than a liquid level threshold (e.g., 10% of a perforated section of the at least one well, 25% of a perforated section of the at least one well, 50% of a perforated section of the at least one well). In some embodiments, an alert, such as a text message, phone call, email, push notification, alarm and/or any other suitable alert, may be transmitted to a user when the measure of the liquid level in the at least one well is determined to exceed a liquid level threshold. The alert may indicate to the user that additional corrective action which may be in the form of user input and/or manual intervention is necessary.

In some embodiments, the liquid level sensor 908 is configured to obtain a measurement of a liquid level in response to a command received by a user. In some embodiments, the liquid level sensor 908 is configured to autonomously obtain measurements of liquid level at a fixed interval (e.g., monthly, weekly, daily, hourly).

As shown in FIG. 9A, a pump 912 may be provided for removing liquid 910 from the gas extraction well 904. For example, as shown in the example of FIG. 9A, the pump 912 may be a submersible pump disposed in the gas extraction well 904. The pump 912 may be a pneumatic pump, an electric pump (e.g., AC or DC powered), and/or any other suitable type of pump. In some embodiments, the pump may be solar powered and/or battery powered. Liquid 910 present in the gas extraction well 904 may be removed from the gas extraction well 904 by activating and/or increasing a pumping rate of the pump 912. In some embodiments, the liquid 910 removed from the gas extraction well 904 is collected in a reservoir external to the gas extraction well 904. The processor 916 may be configured to control the pump 912, for example, according to the techniques described herein.

In some embodiments, the pump may be configured to automatically turn on, for example, when liquid level exceeds a threshold. In some embodiments, the pump may be controlled by a sensor (e.g., a float switch) separate from liquid level sensor 908. The measure of liquid level obtained by liquid level sensor 908 may be used to indicate possible pump malfunction or inability to perform required liquid removal.

Components of the liquid level control system 900 may be battery powered, in some embodiments. In some embodiments, one or more components of the liquid level control system 900 (e.g., the liquid level sensor 908, the pump 912) may be remotely controlled by the processor 916. In some embodiments, the liquid level control system 900 comprises a transmitting device 914. The transmitting device 914 may be configured to wirelessly transmit information such as liquid level measurements, including exceedances, and/or pump operations to an external device. In some embodiments, the information transmitted by the transmitting device 914 to the external device may be stored in a remote data storage of the external device.

In some embodiments, the liquid level control system 900 further comprises a user interface for displaying data and/or receiving user input. For example, the user interface may allow a user to set liquid level thresholds, set alarms, and/or set adjustments to be made in response to an exceedance (e.g., a pump rate to be applied, a pumping duration), for example. In some embodiments, the user interface may display information associated with the liquid level control system 900 such as liquid level measurements and/or adjustments made in response to an exceedance including pump activity. In some embodiments, the user interface may provide a digital map of the landfill 902 which provides a visual indication of liquid levels in each of a plurality of gas extraction wells in the landfill 902.

Figure 9C:
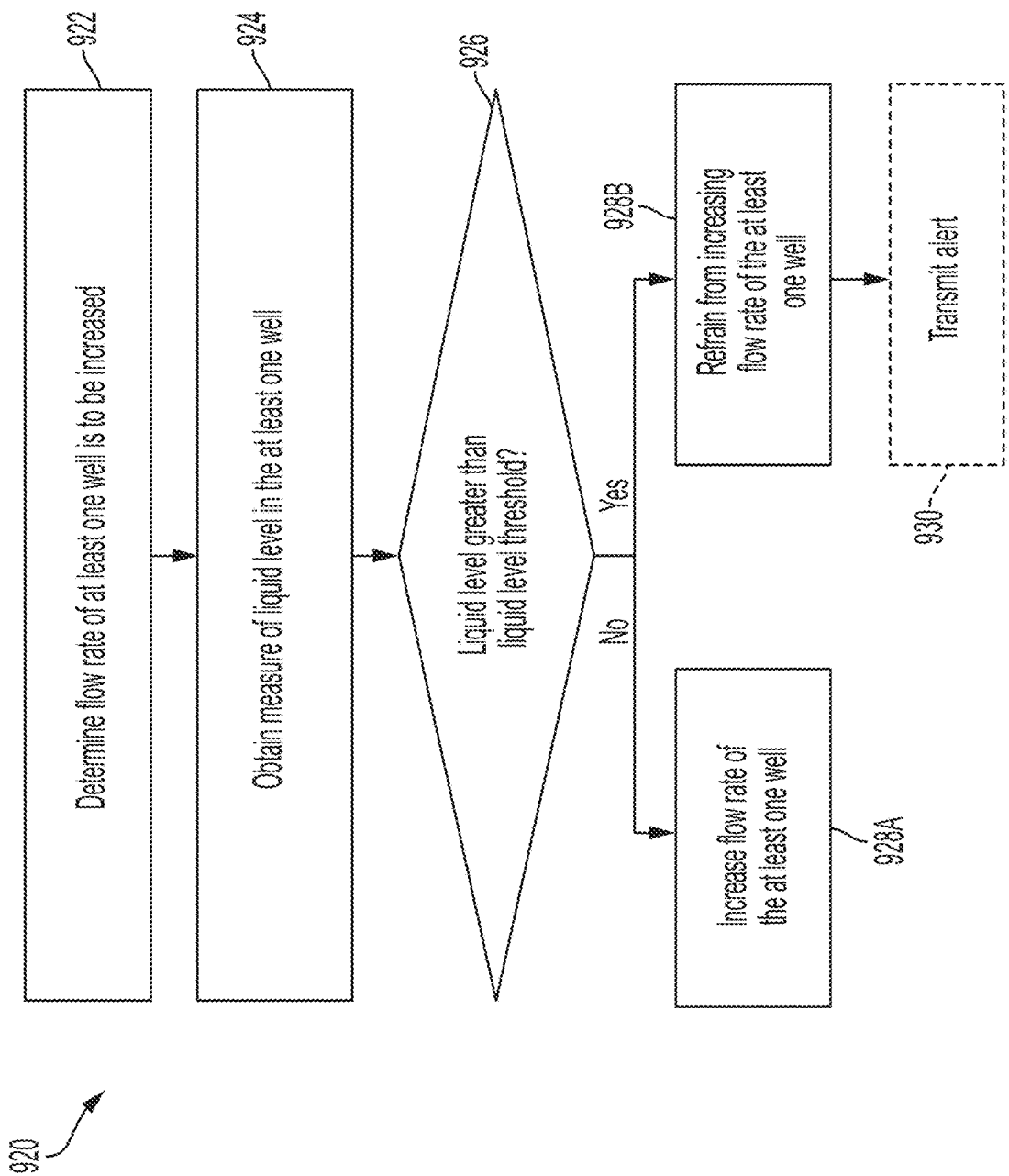
FIG. 9C is a flowchart of an example process for monitoring a liquid level of a gas extraction well during emissions-based control of landfill gas extraction, according to some embodiments.

As described herein, the inventors have developed techniques for liquid level control which may be used in combination with the emissions-based landfill gas extraction techniques described herein. For example, FIG. 9C is a flowchart of an example process 920 for monitoring a liquid level of a gas extraction well during emissions-based control of landfill gas extraction, according to some embodiments.

Process 920 begins at act 922 where it is determined that a flow rate of at least one well is to be increased, for example, at acts 606 or 706 of processes 600 and 700. Before increasing the flow rate of the at least one well, the process 920 proceeds to act 924 where a measure of a liquid level in the at least one well is obtained. For example, the measure of the liquid level in the at least one well may be obtained by a liquid level sensor such as liquid level sensor 908.

At act 926, it is determined whether the measure of liquid level in the at least one well obtained at act 924 is greater than a liquid level threshold (10% of a perforated section of the at least one well, 25% of a perforated section of the at least one well, 50% of a perforated section of the at least one well). A determination that the current liquid level in the at least one well is greater than a liquid level threshold may indicate that increasing the flow rate under such conditions would be hazardous. Thus, only when it is determined that the measure of liquid level obtained at act 924 is not greater than (e.g., less than, less than or equal to) the liquid level threshold does the process 920 proceed through the no branch to act 928A where the flow rate of landfill gas being extracted from the at least one well is increased. If, instead, it is determined that the measure of liquid level in the at least one well is greater than the liquid level threshold, the process 920 may proceed through the yes branch to act 928B where no increase to the flow rate of the at least one well is made (e.g., by maintaining a position of a valve of the at least one well). As such, the process 920 may avoid negative impacts such as reduced gas collection and increased pressure in the gas extraction well resulting in leachate steeps, blow-outs, and/or silt formation in wells by refraining from increasing flow rates in gas extraction wells having excess liquid levels.

In some embodiments, the process 920 may proceed to act 930, where an alert is transmitted. For example, an alert, such as a text message, phone call, email, push notification, alarm and/or any other suitable alert, may be sent to a user when the measure of the liquid level in the at least one well is determined to exceed a liquid level threshold. The alert may indicate to the user that additional corrective action which may be in the form of user input and/or manual intervention is necessary. In some embodiments, the alert may allow a user to perform an override by increasing the flow rate of the at least one well despite a measured liquid level of the at least one well exceeding the liquid level threshold.

In some embodiments, a corrective action may be manually or autonomously applied in response to determining that the measured liquid level of the at least one well is greater than the liquid level threshold. For example, in response to determining that the measured liquid level in the at least one well is greater than the liquid level threshold, a pump, such as pump 912, may be activated (e.g., by turning the pump on, increasing a pumping rate of the pump) to remove excess liquid from the at least one well. In some embodiments, the pump is activated at least until the liquid level in the at least one well falls below the liquid level threshold. In some embodiments, the pump is activated at least until the liquid level in the at least one well falls below a secondary threshold that is lower than the liquid level threshold. In some embodiments, a pumping rate and/or duration may be controlled based on the measure of liquid level in the at least one well obtained at act 924. For example, a higher pumping rate and/or longer pumping duration may be applied where the measured liquid level exceeds the liquid level threshold by a larger amount while a lower pumping rate and/or shorter pumping duration may be applied where the measured liquid level exceeds the liquid level threshold by a smaller amount.

VI. Techniques for Error Checking Valve Adjustments

Figure 10:
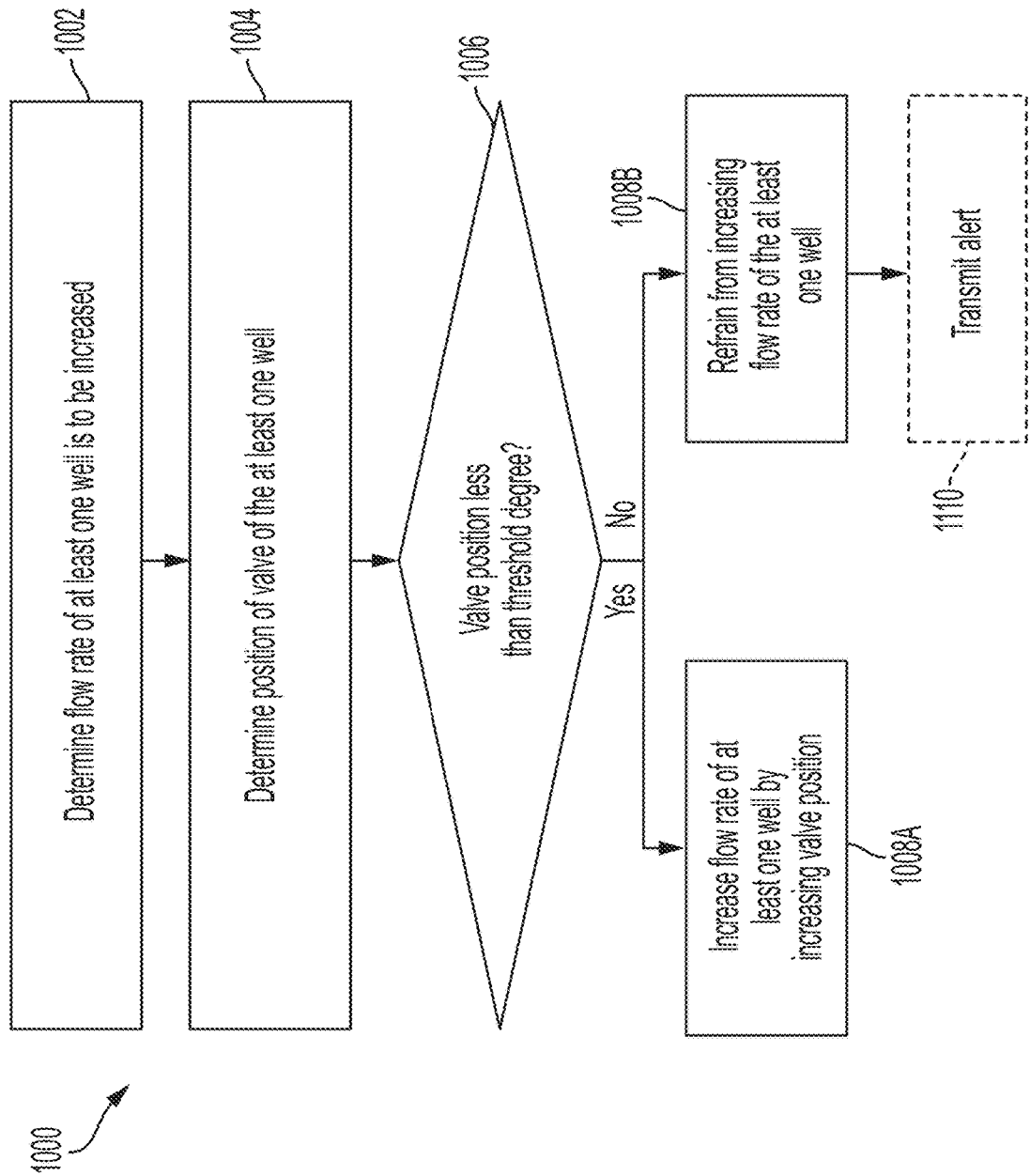
FIG. 10 is a flowchart of an example process for monitoring a valve position of a gas extraction well during emissions-based control of landfill gas extraction, according to some embodiments.

In some embodiments, the emissions-based landfill gas extraction techniques involve performing an error check before increasing the flow rate of landfill gas being extracted from a particular well. For example, FIG. 10 is a flowchart of an example process for monitoring a valve position of a gas extraction well during emissions-based control of landfill gas extraction, according to some embodiments.

Process 1000 begins at act 1002, where it is determined that a flow rate of at least one well is to be increased, for example, at acts 606 or 706 of processes 600 and 700. Before increasing the flow rate of the at least one well, the process 1002 proceeds to act 1004 where a current position of a valve of the at least one well is obtained. For example, the current position of the valve may be expressed as a degree to which the valve is open (e.g., 10% open, 50% open, etc.).

At act 1006, it is determined whether the current position of the valve determined at act 1004 is less than a threshold degree for the valve (e.g., 80% open, 85% open, 90% open, 95% open, 100% open, etc.). In some instances, it may be undesirable to increase flow rates past a certain extent. Thus, the process 1000 proceeds through the yes branch to act 1008A where the flow rate of landfill gas being extracted from the at least one well is increased only when it is determined that current valve position determined at act 1006 is less than the threshold degree. If, instead, it is determined that the position of the valve of the at least one well is not less than the threshold degree, the process 1000 may proceed through the yes branch to act 1008B where no increase to the flow rate of the at least one well is made (e.g., by maintaining a position of a valve of the at least one well).

In some embodiments, the process 1000 may proceed to act 1010, where an alert is transmitted. For example, an alert, such as a text message, phone call, email, push notification, alarm and/or any other suitable alert, may be sent to a user when the valve position is determined not to be less than the threshold degree such that no increase to the flow rate can be made. The alert may indicate to the user that additional corrective action which may be in the form of user input and/or manual intervention is necessary. In some embodiments, the alert may allow a user to perform an override by increasing the flow rate of the at least one well despite the current position of the valve exceeding the threshold degree.

In some embodiments, a corrective action may be manually or autonomously applied in response to determining that the measured liquid level of the at least one well is greater than the liquid level threshold. For example, in response to determining that the measured liquid level in the at least one well is greater than the liquid level threshold, a pump, such as pump 912, may be activated (e.g., by turning the pump on, increasing a pumping rate of the pump) to remove excess liquid from the at least one well. In some embodiments, the pump is activated at least until the liquid level in the at least one well falls below the liquid level threshold. In some embodiments, the pump is activated at least until the liquid level in the at least one well falls below a secondary threshold that is lower than the liquid level threshold. In some embodiments, a pumping rate and/or duration may be controlled based on the measure of liquid level in the at least one well obtained at act 924. For example, a higher pumping rate and/or longer pumping duration may be applied where the measured liquid level exceeds the liquid level threshold by a larger amount while a lower pumping rate and/or shorter pumping duration may be applied where the measured liquid level exceeds the liquid level threshold by a smaller amount.

Although FIG. 10 illustrates a process for performing an error check before increasing a flow rate of landfill gas being extracted from a particular well that is based on valve position, it should be appreciated that the techniques described herein may be based on one or more other characteristics such as upstream and/or downstream gas pressure, gas concentrations, flow rate, and/or any other suitable characteristic.

VII. Example Computing Systems

Figure 11:
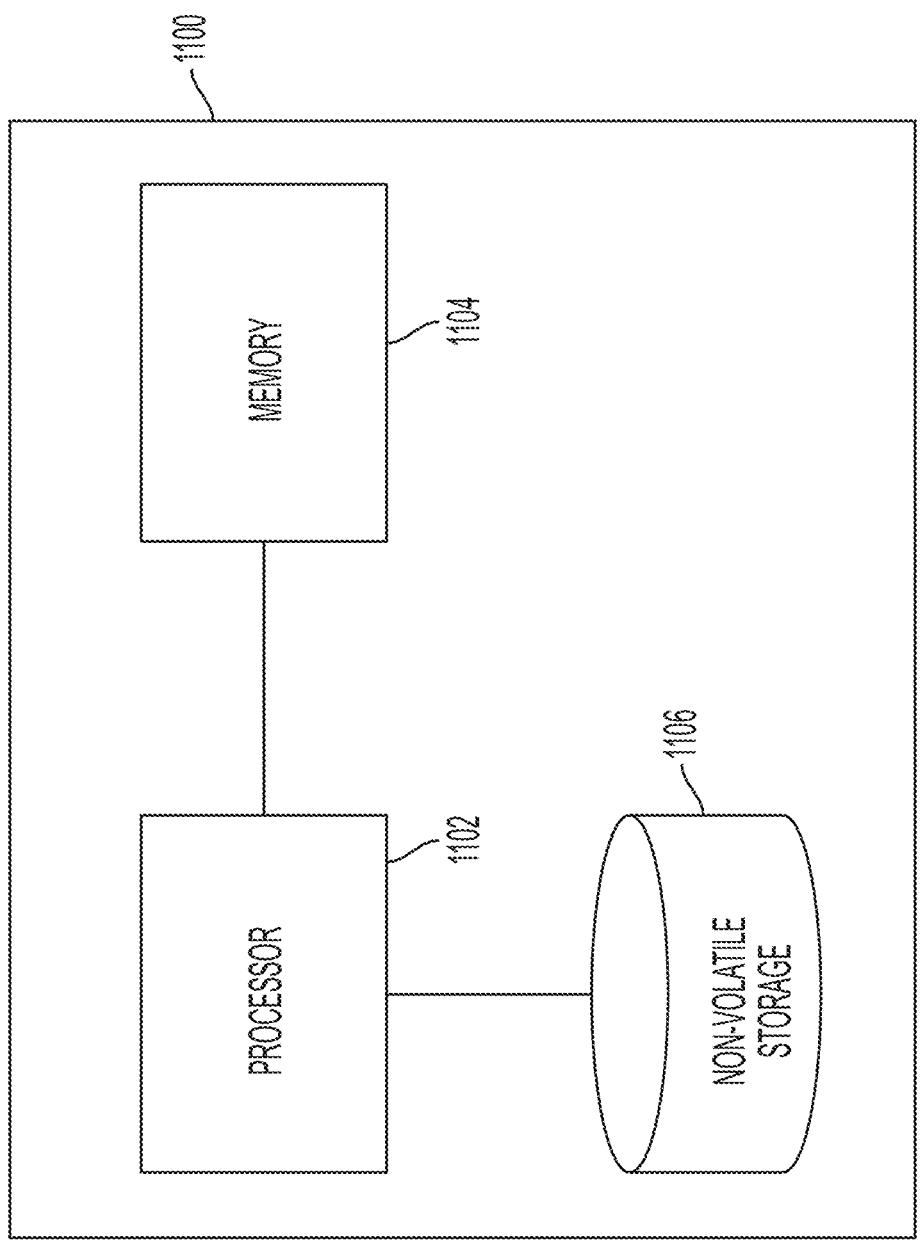
FIG. 11 is a block diagram of an exemplary computer system in which aspects of the present disclosure may be implemented, according to some embodiments.

FIG. 11 shows a block diagram of an example computer system 1100 that may be used to implement embodiments of the technology described herein. The computing device 1100 may include one or more computer hardware processors 1102 and non-transitory computer-readable storage media (e.g., memory 1104 and one or more non-volatile storage devices 1106). The processor(s) 1102 may control writing data to and reading data from (1) the memory 1104; and (2) the non-volatile storage device(s) 1106. To perform any of the functionality described herein, the processor(s) 1102 may execute one or more processor-executable instructions stored in one or more non-transitory computer-readable storage media (e.g., the memory 1104), which may serve as non-transitory computer-readable storage media storing processor-executable instructions for execution by the processor(s) 1102.

VIII. Equivalents and Scope

Embodiments of the above-described techniques can be implemented in any of numerous ways. For example, the embodiments may be implemented using hardware, software or a combination thereof. When implemented in software, the software code can be executed on any suitable processor or collection of processors, whether provided in a single computer or distributed among multiple computers. In some embodiments, the functions performed by an In Situ Control Mechanism 106, controller 204, controllers 510A-C, and/or multi-well controller 516 may be implemented as software executed on one or more processors.

Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the technology described herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present technology as described above. As used herein, the term "computer-readable storage medium" encompasses only a computer-readable medium that can be considered to be a manufacture (i.e., article of manufacture) or a machine. Alternatively or additionally, the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of technology described herein. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, examples of which have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various events/acts are described herein as occurring or being performed at a specified time. One of ordinary skill in the art would understand that such events/acts may occur or be performed at approximately the specified time.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of the technology, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages of the present technology are indicated, it should be appreciated that not every embodiment of the technology will include every described advantage. Some embodiments may not implement any features described as advantageous herein and in some instances. Accordingly, the foregoing description and drawings are by way of example only.

What is claimed is:

1. A method performed by at least one controller, the method comprising:
    obtaining, with at least one sensor, a measure of a concentration of a greenhouse gas in a sample of ambient air, the sample of ambient air being obtained above ground in a region of a landfill;
    determining whether the measure of the concentration of the greenhouse gas is greater than a first threshold; and in response to determining that the measure of the concentration of the greenhouse gas is greater than the first threshold, increasing a flow rate of landfill gas being extracted from at least one well of a plurality of wells in the region of the landfill.

2. The method of claim 1, further comprising obtaining the sample of ambient air above ground prior to obtaining the measure of the concentration of the greenhouse gas in the sample of ambient air.

3. The method of claim 1, wherein the obtaining the measure of the concentration of the greenhouse gas is performed above the ground.

4. The method of claim 1, wherein the at least one sensor comprises at least one aerial optical sensor.

5. The method of claim 1, wherein the at least one sensor comprises at least one ground-based optical sensor.

6. The method of claim 1, wherein the greenhouse gas comprises methane.

7. The method of claim 6, wherein the first threshold comprises 500 ppm methane measured 1 meter above ground in the region of the landfill.

8. The method of claim 6, wherein the first threshold comprises 0 ppm methane measured 1 meter above ground in the region of the landfill.

9. The method of claim 1, wherein the greenhouse gas comprises carbon dioxide.

10. The method of claim 1, wherein increasing the flow rate of landfill gas being extracted from the at least one well comprises increasing a flow rate of landfill gas being extracted from a subset of the plurality of wells, wherein the subset of the plurality of wells comprises one or more of the plurality of wells extracting landfill gas having an oxygen concentration below a second threshold.

11. The method of claim 1, wherein increasing the flow rate of landfill gas being extracted from the at least one well of the plurality of wells comprises:
identifying a subset of the plurality of wells based on their respective measured concentrations of a constituent gas; and
increasing a flow rate of landfill gas being extracted from the subset of the plurality of wells.

12. The method of claim 11, wherein a measured concentration of the constituent gas for each well in the subset of the plurality of wells is among a bottom 50% of measured concentrations of the constituent gas for wells in the plurality of wells.

13. The method of claim 11, wherein the constituent gas comprises oxygen.

14. The method of claim 11, wherein the constituent gas comprises balance gas.

15. The method of claim 1, wherein increasing the flow rate of landfill gas being extracted from the at least one well of the plurality of wells comprises increasing a vacuum applied to the plurality of wells.

16. A control system comprising:
at least one controller configured to:
obtain, with at least one sensor, a measure of a concentration of a greenhouse gas in a sample of ambient air, the sample of ambient air being obtained above ground in a region of a landfill;
determine whether the measure of the concentration of the greenhouse gas is greater than a first threshold; and
in response to determining that the measure of the concentration of the greenhouse gas is greater than the first threshold, increase a flow rate of landfill gas being extracted from at least one well of a plurality of wells in the region of the landfill.

17. The control system of claim 16, wherein the at least one controller is further configured to obtain the sample of ambient air above ground prior to obtaining the measure of the concentration of the greenhouse gas in the sample of ambient air.

18. The control system of claim 16, wherein the at least one controller is configured to obtain the measure of the concentration of the greenhouse gas above the ground.

19. The control system of claim 16, wherein the greenhouse gas comprises methane.

20. The control system of claim 16, wherein the greenhouse gas comprises carbon dioxide.

* * * * *